United States Patent
Shimomura et al.

(10) Patent No.: US 12,047,973 B2
(45) Date of Patent: *Jul. 23, 2024

(54) BASE STATION DEVICE, TERMINAL DEVICE, WIRELESS COMMUNICATION SYSTEM, AND WIRELESS COMMUNICATION METHOD

(71) Applicant: FUJITSU LIMITED, Kawasaki (JP)

(72) Inventors: Tsuyoshi Shimomura, Yokohama (JP); Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,374

(22) Filed: Jun. 12, 2023

(65) Prior Publication Data

US 2023/0328748 A1    Oct. 12, 2023

Related U.S. Application Data

(63) Continuation of application No. 16/992,987, filed on Aug. 13, 2020, now Pat. No. 11,716,738, which is a
(Continued)

(51) Int. Cl.
*H04W 72/23* (2023.01)
*H04L 1/1812* (2023.01)
*H04W 28/04* (2009.01)

(52) U.S. Cl.
CPC ........... *H04W 72/23* (2023.01); *H04L 1/1812* (2013.01); *H04W 28/04* (2013.01)

(58) Field of Classification Search
CPC ... H04L 1/0026; H04L 1/1812; H04L 1/1825; H04L 1/1887; H04L 1/1896; H04W 28/04; H04W 72/042
See application file for complete search history.

(56) References Cited

U.S. PATENT DOCUMENTS 8,522,100 B2    8/2013  Miki et al.
9,894,651 B2    2/2018  Novlan et al.
(Continued)

FOREIGN PATENT DOCUMENTS

CN    107769899 A     3/2018
CN    110383914 B  *  2/2021  ........... H04L 5/0044
(Continued)

OTHER PUBLICATIONS

3GPP TR 38.801 V14.0.0, "3rd Generation Partnership Project; Technical Specification Group Radio Access Network; Study on new radio access technology: Radio access architecture and interfaces," (Release 14), Mar. 2017.
(Continued)

*Primary Examiner* — Eric Nowlin
(74) *Attorney, Agent, or Firm* — Myers Wolin, LLC

(57) ABSTRACT

A base station device that allocates wireless resources to a terminal device and performs wireless communication with the terminal device using the allocated wireless resources, the base station device includes, deciding controller that decides, out of a plurality of retransmission patterns, a retransmission pattern for performing retransmission of data to the terminal device, in accordance with a communication state of wireless communication, and a transmitter that performs initial-time transmission processing of transmitting a control signal for wireless resource allocation control, and a data signal for data transmission including data to be transmitted to the terminal device, including retransmission pattern information relating to the retransmission pattern that has been decided, and retransmission processing of retransmitting the data signal including data to be transmitted to the terminal device, in accordance with the retransmission pattern that has been decided.

14 Claims, 14 Drawing Sheets

WIRELESS COMMUNICATION SYSTEM 10

Related U.S. Application Data continuation of application No. PCT/JP2018/005192, filed on Feb. 15, 2018.

(56) References Cited

U.S. PATENT DOCUMENTS

| | | | |
|---|---|---|---|
| 10,390,262 B2 | 8/2019 | Tsuboi et al. | |
| 10,893,507 B2 | 1/2021 | Mu et al. | |
| 10,965,407 B2 | 3/2021 | Ying et al. | |
| 10,966,162 B2 | 3/2021 | Yi et al. | |
| 11,057,898 B2 | 7/2021 | Qian et al. | |
| 11,115,847 B2 | 9/2021 | Tsuboi et al. | |
| 11,757,602 B2* | 9/2023 | Yoshioka | H04L 1/0002 370/329 |
| 2008/0123593 A1 | 5/2008 | Fujita et al. | |
| 2010/0088567 A1 | 4/2010 | Miki et al. | |
| 2010/0177713 A1 | 7/2010 | Yoshii et al. | |
| 2015/0085805 A1* | 3/2015 | Li | H04W 72/121 370/329 |
| 2016/0044665 A1 | 2/2016 | Novlan et al. | |
| 2016/0050667 A1 | 2/2016 | Papasakellariou et al. | |
| 2016/0374055 A1 | 12/2016 | Morita et al. | |
| 2017/0366999 A1 | 12/2017 | Tsuboi et al. | |
| 2018/0020378 A1 | 1/2018 | Tsuboi et al. | |
| 2018/0115925 A1 | 4/2018 | Moroga et al. | |
| 2018/0146438 A1 | 5/2018 | Yi et al. | |
| 2018/0199371 A1 | 7/2018 | Srinivasan et al. | |
| 2018/0219649 A1 | 8/2018 | Ying et al. | |
| 2019/0081739 A1 | 3/2019 | Nammi | |
| 2019/0230630 A1 | 7/2019 | Mu et al. | |
| 2019/0296809 A1 | 9/2019 | Li et al. | |
| 2020/0044793 A1 | 2/2020 | Sundararajan et al. | |
| 2020/0099468 A1 | 3/2020 | Xia et al. | |
| 2021/0014879 A1 | 1/2021 | Bae et al. | |
| 2021/0320757 A1 | 10/2021 | Wang et al. | |
| 2022/0052830 A1* | 2/2022 | Yoshioka | H04L 1/0007 |

FOREIGN PATENT DOCUMENTS

| | | | | |
|---|---|---|---|---|
| CN | 112887074 A * | 6/2021 | | H04L 5/0044 |
| EP | 2858398 A1 * | 4/2015 | | H04L 5/1423 |
| EP | 3244653 A1 | 11/2017 | | |
| EP | 3244684 A1 | 11/2017 | | |
| EP | 3282591 A1 | 2/2018 | | |
| EP | 2858398 B1 * | 8/2018 | | H04L 5/1423 |
| EP | 3295751 B1 | 10/2020 | | |
| EP | 3606209 B1 * | 1/2022 | | H04L 5/0044 |
| JP | 2009-111789 A | 5/2009 | | |
| JP | 2018-515987 A | 6/2018 | | |
| JP | 2019-525670 A | 9/2019 | | |
| JP | 6777627 B2 | 10/2020 | | |
| WO | 2007/007380 A1 | 1/2007 | | |
| WO | 2008/018462 A1 | 2/2008 | | |
| WO | 2010/052620 A1 | 5/2010 | | |
| WO | 2014/208351 A1 | 12/2014 | | |
| WO | 2016/144143 A1 | 9/2016 | | |
| WO | 2016/163505 A1 | 10/2016 | | |
| WO | 2016/182320 A1 | 11/2016 | | |
| WO | 2018/033112 A1 | 2/2018 | | |
| WO | 2020/028372 A1 | 2/2020 | | |
| WO | 2021/203231 A1 | 10/2021 | | |
| WO | 2021/204079 A1 | 10/2021 | | |

OTHER PUBLICATIONS

3GPP TR 38.802 V14.2.0, "3rd Generation Partnership Project; Technical Specification Group Radio Access Network; Study on New Radio Access Technology; Physical Layer Aspects," (Release 14), Sep. 2017.

3GPP TR 38.803 V14.2.0, "3rd Generation Partnership Project; Technical Specification Group Radio Access Network; Study on new radio access technology: Radio Frequency (RF) and co-existence aspects," (Release 14), Sep. 2017.

3GPP TR 38.804 V14.0.0, 3rd Generation Partnership Project; Technical Specification Group Radio Access Network; Study on New Radio Access Technology; Radio Interface Protocol Aspects, (Release 14), Mar. 2017.

3GPP TR 38.900 V14.3.1, "3rd Generation Partnership Project; Technical Specification Group Radio Access Network; Study on channel model for frequency spectrum above 6 GHz," (Release 14), Jul. 2017.

3GPP TR 38.912 V14.1.0, "3rd Generation Partnership Project; Technical Specification Group Radio Access Network; Study on New Radio (NR) access technology," (Release 14), Jun. 2017.

3GPP TR 38.913 V14.3.0, "3rd Generation Partnership Project; Technical Specification Group Radio Access Network; Study on Scenarios and Requirements for Next Generation Access Technologies," (Release 14), Jun. 2017.

3GPP TS 38.321 V15.0.0, "3rd Generation Partnership Project; Technical Specification Group Radio Access Network; NR; Medium Access Control (MAC) protocol specification," (Release 15), Dec. 2017.

3GPP TS 38.322 V15.0.0, "3rd Generation Partnership Project; Technical Specification Group Radio Access Network; NR; Radio Link Control (RLC) protocol specification," (Release 15), Dec. 2017.

3GPP TS 38.323 V15.0.0, "3rd Generation Partnership Project; Technical Specification Group Radio Access Network; NR; Packet Data Convergence Protocol (PDCP) specification," (Release 15), Dec. 2017.

3GPP TS 38.331 V15.0.0, "3rd Generation Partnership Project; Technical Specification Group Radio Access Network; NR; Radio Resource Control (RRC); Protocol specification," (Release 15), Dec. 2017.

3GPP TS 38.401 V15.0.0, "3rd Generation Partnership Project; Technical Specification Group Radio Access Network; NG-RAN; Architecture description," (Release 15), Dec. 2017.

Nokia, "TS 38.410 v.0.6.0.", 3GPP TSG-RAN WG3 Meeting #98, R3-175055, Agenda item 10.11.4, Nov. 27-Dec. 1, 2017, Reno, USA.

Nokia, "TS 38.413 v.0.5.0. covering agreements of RAN3 #98", 3GPP TSG-RAN WG3 Meeting #98, R3-175056, Agenda item 10, Nov. 27-Dec. 1, 2017, Reno, USA.

QUALCOMM Incorporated, "TS 38.420 baseline", 3GPP TSG-RAN WG3 Meeting #98, R3-175057, Agenda item 10.11.4, Nov. 27-Dec. 1, 2017, Reno, USA.

Ericsson, "TS 38.423 v.0.5.0. covering agreements of RAN3 #98", 3GPP TSG-RAN WG3 Meeting #98, R3-175058, Agenda item 10, Nov. 27-Dec. 1, 2017, Reno, NV, USA.

3GPP TS 38.470 V15.0.0, "3rd Generation Partnership Project; Technical Specification Group Radio Access Network; NG-RAN; F1 general aspects and principles," (Release 15), Jan. 2018.

3GPP TS 38.473 V15.0.0, "3rd Generation Partnership Project; Technical Specification Group Radio Access Network; NG-RAN; F1 application protocol (F1AP)," (Release 15), Dec. 2017.

3GPP TS 36.211 V15.0.0, "3rd Generation Partnership Project; Technical Specification Group Radio Access Network; Evolved Universal Terrestrial Radio Access (E-UTRA); Physical channels and modulation," (Release 15), Dec. 2017.

3GPP TS 36.212 V15.0.1, "3rd Generation Partnership Project; Technical Specification Group Radio Access Network; Evolved Universal Terrestrial Radio Access (E-UTRA); Multiplexing and channel coding," (Release 15), Jan. 2018.

3GPP TS 36.213 V15.0.0, "3rd Generation Partnership Project; Technical Specification Group Radio Access Network; Evolved Universal Terrestrial Radio Access (E-UTRA); Physical layer procedures," (Release 15), Dec. 2017.

3GPP TS 36.300 V15.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," (Release 15), Dec. 2017.

3GPP TS 36.321 V15.0.0, "3rd Generation Partnership Project; Technical Specification Group Radio Access Network; Evolved Universal Terrestrial Radio Access (E-UTRA); Medium Access Control (MAC) protocol specification," (Release 15), Dec. 2017.

(56) References Cited

OTHER PUBLICATIONS

3GPP TS 36.322 V15.0.0, "3rd Generation Partnership Project; Technical Specification Group Radio Access Network; Evolved Universal Terrestrial Radio Access (E-UTRA); Radio Link Control (RLC) protocol specification," (Release 15), Dec. 2017.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification," (Release 14), Dec. 2017.
3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification," (Release 15), Jan. 2018.
3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP)," (Release 15), Dec. 2017.
3GPP TS 36.423 V15.0.0, "3rd Generation Partnership Project; Technical Specification Group Radio Access Network; Evolved Universal Terrestrial Radio Access Network (E-UTRAN); X2 application protocol (X2AP)," (Release 15), Dec. 2017.
3GPP TS 36.425 V14.0.0, "3rd Generation Partnership Project; Technical Specification Group Radio Access Network; Evolved Universal Terrestrial Radio Access Network (E-UTRAN); X2 interface user plane protocol," (Release 14), Mar. 2017.
3GPP TS 37.340 V15.0.0, "3rd Generation Partnership Project; Technical Specification Group Radio Access Network; Evolved Universal Terrestrial Radio Access (E-UTRA) and NR; Multi-connectivity; Stage 2," (Release 15), Dec. 2017.
3GPP TS 38.201 V15.0.0, "3rd Generation Partnership Project; Technical Specification Group Radio Access Network; NR; Physical layer; General description," (Release 15), Dec. 2017.
3GPP TS 38.202 V15.0.0, "3rd Generation Partnership Project; Technical Specification Group Radio Access Network; NR; Services provided by the physical layer," (Release 15), Dec. 2017.
3GPP TS 38.211 V15.0.0, "3rd Generation Partnership Project; Technical Specification Group Radio Access Network; NR; Physical channels and modulation," (Release 15), Dec. 2017.
3GPP TS 38.212 V15.0.0, "3rd Generation Partnership Project; Technical Specification Group Radio Access Network; NR; Multiplexing and channel coding," (Release 15), Dec. 2017.
3GPP TS 38.213 V15.0.0, "3rd Generation Partnership Project; Technical Specification Group Radio Access Network; NR; Physical layer procedures for control," (Release 15), Dec. 2017.
3GPP TS 38.214 V15.0.0, "3rd Generation Partnership Project; Technical Specification Group Radio Access Network; NR; Physical layer procedures for data," (Release 15), Dec. 2017.
3GPP TS 38.215 V15.0.0, "3rd Generation Partnership Project; Technical Specification Group Radio Access Network; NR; Physical layer measurements," (Release 15), Dec. 2017.
3GPP TS 38.300 V15.0.0, "3rd Generation Partnership Project; Technical Specification Group Radio Access Network; NR; NR and NG-RAN Overall Description; Stage 2," (Release 15), Dec. 2017.
Written Opinion of the International Searching Authority issued for corresponding International Patent Application No. PCT/JP2018/005192 mailed on May 1, 2018, with an English translation.
International Search Report issued by the Japan Patent Office for corresponding International Patent Application No. PCT/JP2018/005192, mailed on May 1, 2018, with an English translation.
First Notification of Office Action and Search Report issued by the China National Intellectual Property Administration for corresponding Chinese Patent Application No. 201880089298.4, dated Feb. 27, 2023, with an English translation.
Non-Final Office Action issued by the United States Patent and Trademark Office for corresponding U.S. Appl. No. 16/992,987, electronically delivered on Mar. 15, 2022.
Final Office Action issued by the United States Patent and Trademark Office for corresponding U.S. Appl. No. 16/992,987, electronically delivered on Jul. 28, 2022.
Final Office Action issued by the United States Patent and Trademark Office for corresponding U.S. Appl. No. 16/992,987, electronically delivered on Nov. 7, 2022.
Notice of Allowance issued by the United States Patent and Trademark Office for corresponding U.S. Appl. No. 16/992,987, electronically delivered on Mar. 15, 2023.
Second Notification of Office Action issued by the China National Intellectual Property Administration for corresponding Chinese Patent Application No. 201880089298.4, dated Aug. 2, 2023, with an English translation.

* cited by examiner

FIG. 8

| RETRANSMISSION PATTERN | TRANSMISSION COUNT | RETRANSMISSION COUNT (BREAKDOWN) | | | RETRANSMISSION CHARACTERISTICS (BY EACH RETRANSMISSION COUNT) |
|---|---|---|---|---|---|
| | | SAME TIME, DIFFERENT FREQUENCY | DIFFERENT TIME, SAME FREQUENCY | DIFFERENT TIME, DIFFERENT FREQUENCY | |
| 0 | 1 | 0 | 0 | 0 | - |
| 1 | 2 | | | 1 | TRANSMIT TEMPORALLY CONSECUTIVELY AT FREQUENCY DIFFERENT FROM FIRST TIME BY FB |
| 2 | 2 | 1 | | | TRANSMIT AT FREQUENCY DIFFERENT FROM FIRST TIME BY FA |
| 3 | 3 | | | 2 | SECOND TIME: TRANSMIT TEMPORALLY CONSECUTIVELY AT FREQUENCY DIFFERENT FROM FIRST TIME BY FB<br>THIRD TIME: TRANSMIT TEMPORALLY CONSECUTIVELY AT FREQUENCY DIFFERENT FROM SECOND TIME BY FB |
| 4 | 3 | 1 | | 1 | SECOND TIME: TRANSMIT AT FREQUENCY DIFFERENT FROM FIRST TIME BY FA<br>THIRD TIME: TRANSMIT TEMPORALLY CONSECUTIVELY AT FREQUENCY DIFFERENT FROM FIRST TIME BY FB |
| 5 | 4 | | | 3 | SECOND TIME: TRANSMIT TEMPORALLY CONSECUTIVELY AT FREQUENCY DIFFERENT FROM FIRST TIME BY FB<br>THIRD TIME: TRANSMIT TEMPORALLY CONSECUTIVELY AT FREQUENCY DIFFERENT FROM SECOND TIME BY FB<br>FOURTH TIME: TRANSMIT TEMPORALLY CONSECUTIVELY AT FREQUENCY DIFFERENT FROM THIRD TIME BY FB |
| 6 | 4 | | | 3 | SECOND TIME: TRANSMIT TEMPORALLY CONSECUTIVELY AT FREQUENCY DIFFERENT FROM FIRST TIME BY FB<br>THIRD TIME: TRANSMIT AFTER PREDETERMINED TIME PERIOD ELAPSES AT FREQUENCY DIFFERENT FROM SECOND TIME BY FB<br>FOURTH TIME: TRANSMIT TEMPORALLY CONSECUTIVELY AT FREQUENCY DIFFERENT FROM THIRD TIME BY FB |
| 7 | 4 | 1 | 1 | 1 | SECOND TIME: TRANSMIT AT FREQUENCY DIFFERENT FROM FIRST TIME BY FA<br>THIRD TIME: TRANSMIT TEMPORALLY CONSECUTIVELY FROM FIRST TIME<br>FOURTH TIME: TRANSMIT AT FREQUENCY DIFFERENT FROM THIRD TIME BY FA |
| 8 | 4 | 1 | 1 | 1 | SECOND TIME: TRANSMIT AT FREQUENCY DIFFERENT FROM FIRST TIME BY FA<br>THIRD TIME: TRANSMIT AFTER PREDETERMINED TIME PERIOD ELAPSES FROM FIRST TIME<br>FOURTH TIME: TRANSMIT AT FREQUENCY DIFFERENT FROM THIRD TIME BY FA |
| 9 | 4 | 1 | 1 | 1 | DIVIDE SECOND TIME IN REPEAT TRANSMISSION PATTERN 8 INTO TWO SLOTS WITH DIFFERENT FREQUENCY AND DIFFERENT TIME, AND TRANSMIT |

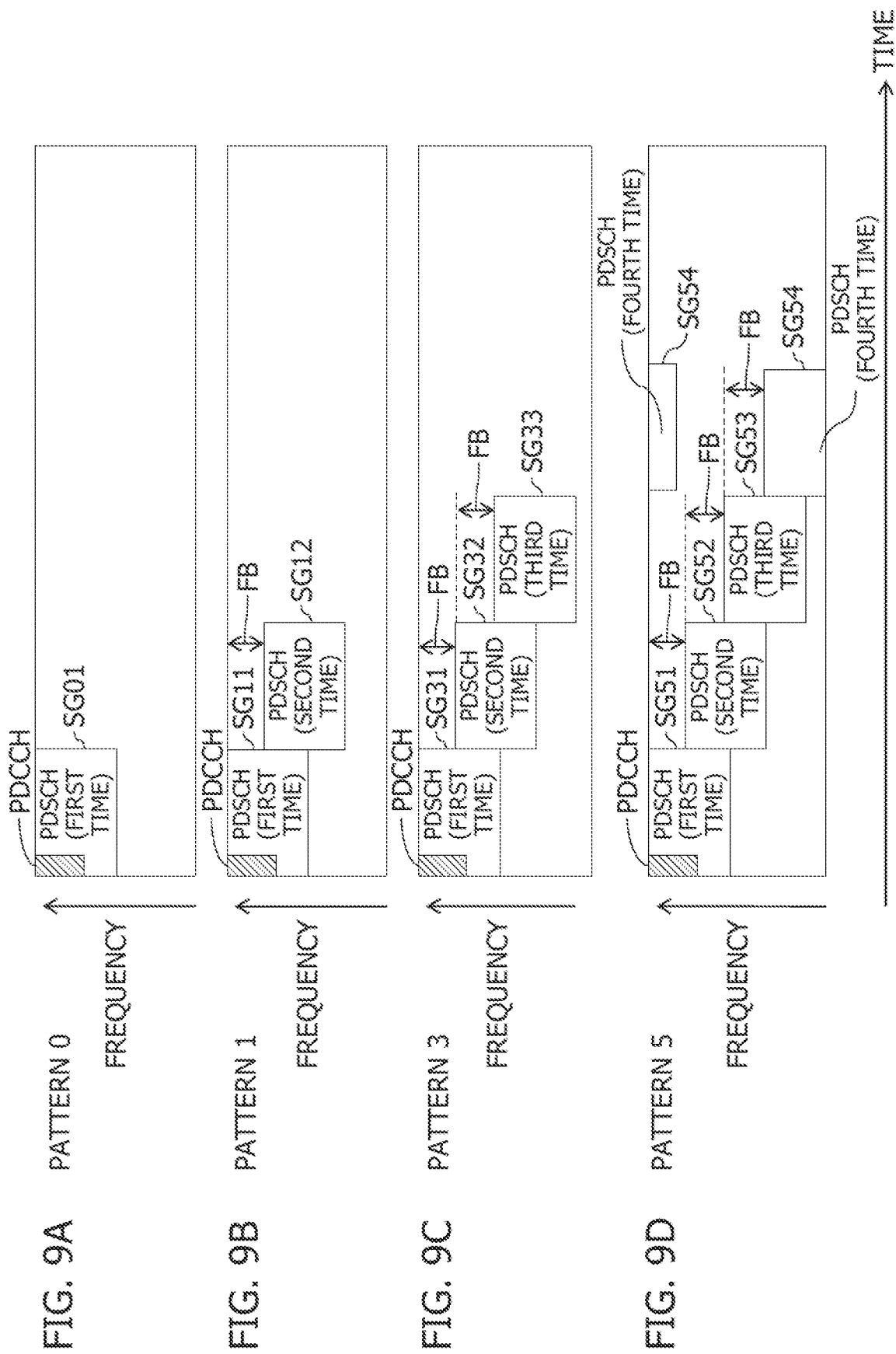

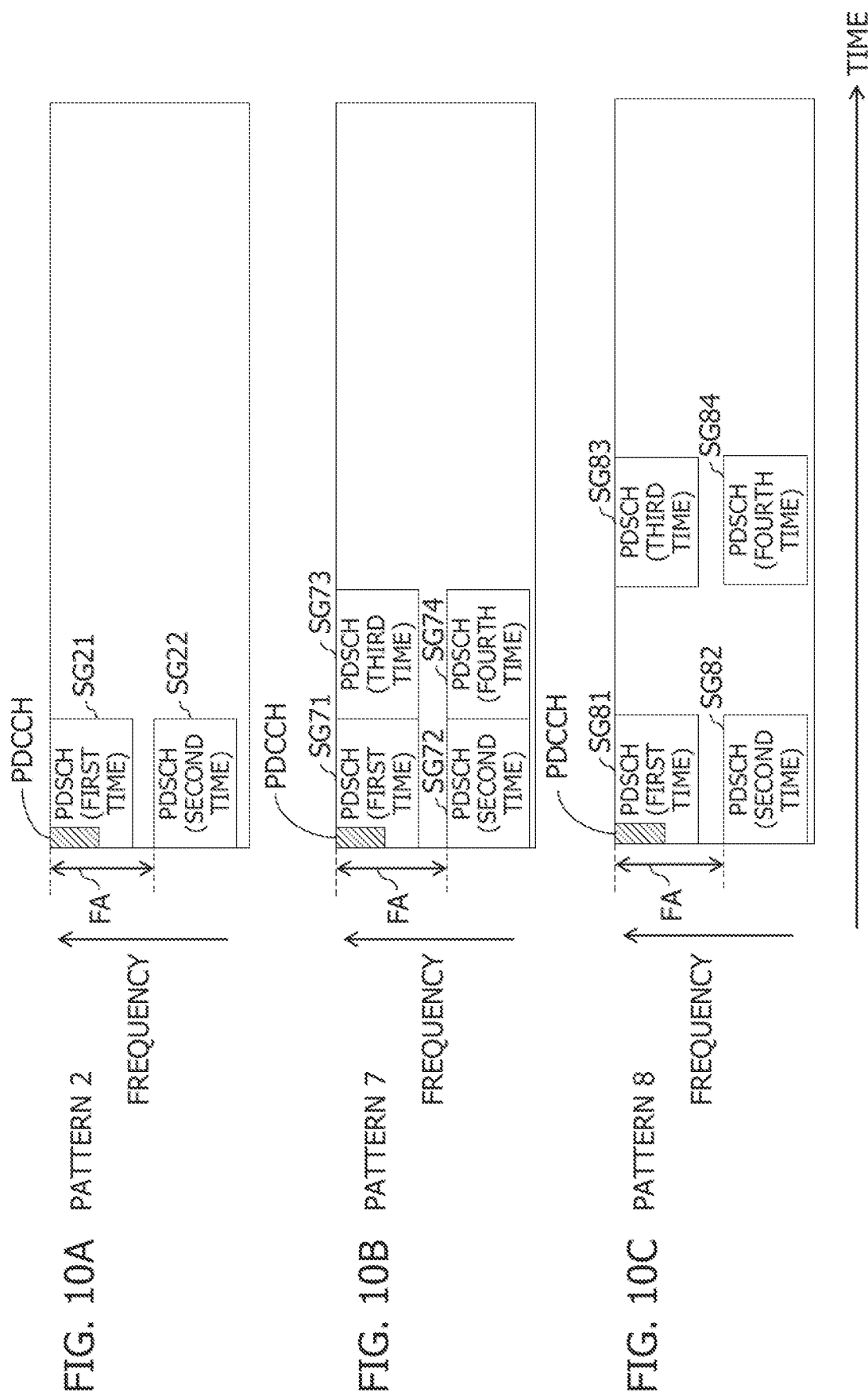

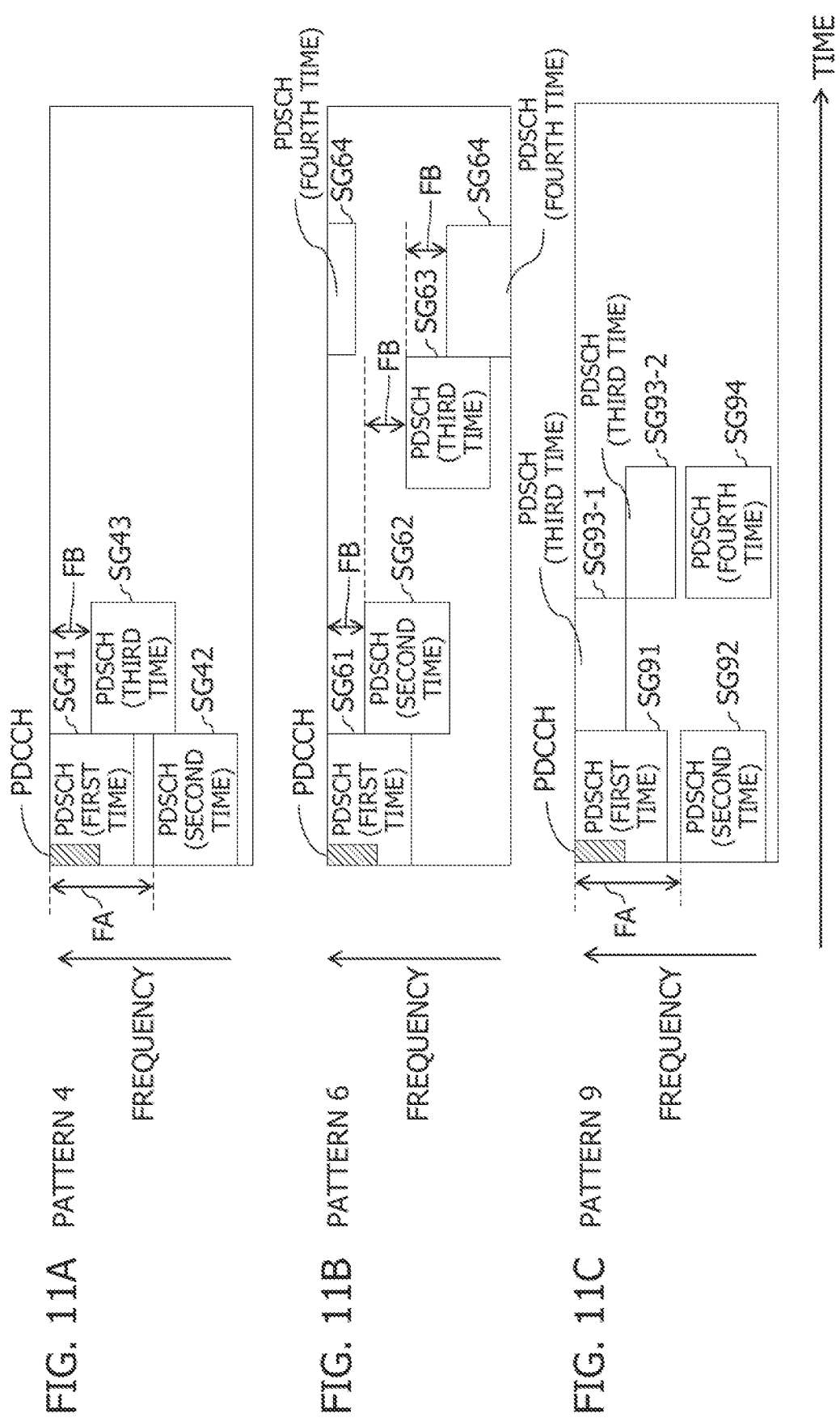

BASE STATION DEVICE, TERMINAL DEVICE, WIRELESS COMMUNICATION SYSTEM, AND WIRELESS COMMUNICATION METHOD

CROSS-REFERENCE TO RELATED APPLICATION

This application is a continuation application of U.S. application Ser. No. 16/992,987 filed on Aug. 13, 2020, which is a continuation application of International Application No. PCT/JP2018/005192 filed on Feb. 15, 2018, and designated the U.S., the entire contents of each are incorporated herein by reference.

FIELD

The present invention relates to a base station device, a terminal device, a wireless communication system, and a wireless communication method.

BACKGROUND

Mobile terminal (e.g., smartphone and future phone) traffic currently takes up the greater part of network resources. Traffic used by mobile terminals also is in a trend of expanding.

On the other hand, there is demand for networks to handle services with various requirement conditions, as IoT (Internet of a things) services (e.g., traffic systems, smart meters, monitoring systems of devices and so forth) are being implemented. Accordingly, technology for realizing even greater high data rates, large capacity, and low latency is demanded in the 5th generation mobile communication systems (5G, or NR (New Radio)) communication standard, in addition to the standard technology of 4G (4th generation mobile communication systems).

5G anticipates supporting many usage cases classified into, for example, eMBB (Enhanced Mobile BroadBand), Massive MTC (Machine Type Communications), and URLLC (Ultra-Reliable and Low Latency Communication), to handle a wide variety of services as described above.

Realization of URLLC, which is one of the usage cases, is difficult. High reliability is demanded of URLLC, and a lower wireless portion error rate than conventionally realized is demanded. One method of realizing ultra-high reliability is to increase the amount of resources used, and impart redundancy to the data. However, wireless resources are limited, and are not endlessly increasable.

Also, low latency demands in URLLC are that uplink and downlink user plane wireless portion latency be lower values than in a 4G network, for example.

URLLC has to satisfy the two requests of ultra-high reliability and low latency at the same time, as described above.

Technology regarding URLLC is described in the following literature.

CITATION LIST

Non-Patent Literature

NON PATENT LITERATURE 1: 3GPP TS 36.211 V15.0.0 (December 2017)
NON PATENT LITERATURE 2: 3GPP TS 36.212 V15.0.1 (January 2018)
NON PATENT LITERATURE 3: 3GPP TS 36.213 V15.0.0 (December 2017)
NON PATENT LITERATURE 4: 3GPP TS 36.300 V15.0.0 (December 2017)
NON PATENT LITERATURE 5: 3GPP TS 36.321 V15.0.0 (December 2017)
NON PATENT LITERATURE 6: 3GPP TS 36.322 V15.0.0 (December 2017)
NON PATENT LITERATURE 7: 3GPP TS 36.323 V14.5.0 (December 2017)
NON PATENT LITERATURE 8: 3GPP TS 36.331 V15.0.1 (January 2018)
NON PATENT LITERATURE 9: 3GPP TS 36.413 V15.0.0 (December 2017)
NON PATENT LITERATURE 10: 3GPP TS 36.423 V15.0.0 (December 2017)
NON PATENT LITERATURE 11: 3GPP TS 36.425 V14.0.0 (March 2017)
NON PATENT LITERATURE 12: 3GPP TS 37.340 V15.0.0 (December 2017)
NON PATENT LITERATURE 13: 3GPP TS 38.201 V15.0.0 (December 2017)
NON PATENT LITERATURE 14: 3GPP TS 38.202 V15.0.0 (December 2017)
NON PATENT LITERATURE 15: 3GPP TS 38.211 V15.0.0 (December 2017)
NON PATENT LITERATURE 16: 3GPP TS 38.212 V15.0.0 (December 2017)
NON PATENT LITERATURE 17: 3GPP TS 38.213 V15.0.0 (December 2017)
NON PATENT LITERATURE 18: 3GPP TS 38.214 V15.0.0 (December 2017)
NON PATENT LITERATURE 19: 3GPP TS 38.215 V15.0.0 (December 2017)
NON PATENT LITERATURE 20: 3GPP TS 38.300 V15.0.0 (December 2017)
NON PATENT LITERATURE 21: 3GPP TS 38.321 V15.0.0 (December 2017)
NON PATENT LITERATURE 22: 3GPP TS 38.322 V15.0.0 (December 2017)
NON PATENT LITERATURE 23: 3GPP TS 38.323 V15.0.0 (December 2017)
NON PATENT LITERATURE 24: 3GPP TS 38.331 V15.0.0 (December 2017)
NON PATENT LITERATURE 25: 3GPP TS 38.401 V15.0.0 (December 2017)
NON PATENT LITERATURE 26: 3GPP TS 38.410 V 0.6.0 (December 2017)
NON PATENT LITERATURE 27: 3GPP TS 38.413 V0.5.0 (December 2017)
NON PATENT LITERATURE 28: 3GPP TS 38.420 V0.5.0 (December 2017)
NON PATENT LITERATURE 29: 3GPP TS 38.423 V0.5.0 (December 2017)
NON PATENT LITERATURE 30: 3GPP TS 38.470 V15.0.0 (January 2018)
NON PATENT LITERATURE 31: 3GPP TS 38.473 V15.0.0 (December 2017)
NON PATENT LITERATURE 32: 3GPP TR 38.801 V14.0.0 (April 2017)
NON PATENT LITERATURE 33: 3GPP TR 38.802 V14.2.0 (September 2017)
NON PATENT LITERATURE 34: 3GPP TR 38.803 V14.2.0 (September 2017)
NON PATENT LITERATURE 35: 3GPP TR 38.804 V14.0.0 (March 2017)

NON PATENT LITERATURE 36: 3GPP TR 38.900 V14.3.1 (July 2017)
NON PATENT LITERATURE 37: 3GPP TR 38.912 V14.1.0 (June 2017)
NON PATENT LITERATURE 38: 3GPP TR 38.913 V14.3.0 (June 2017)

However, there are cases where data transmitted from a base station device to a terminal device does not arrive with predetermined quality, in situations where the wireless environment is poor, for example. In this case, low latency is not satisfied with data retransmission occurring and so forth. Also, for example, if the base station device that has transmitted data awaits an ACK (Acknowledgement) confirming the arrival of data or a NACK (Negative Acknowledgement) indicating that data did not arrive without error before retransmitting data, arrival of data to the terminal device is delayed even further, and there are cases where low latency is not realized.

SUMMARY

A base station device that allocates wireless resources to a terminal device and performs wireless communication with the terminal device using the allocated wireless resources, the base station device includes, deciding controller that decides, out of a plurality of retransmission patterns, a retransmission pattern for performing retransmission of data to the terminal device, in accordance with a communication state of wireless communication, and a transmitter that performs initial-time transmission processing of transmitting a control signal for wireless resource allocation control, and a data signal for data transmission including data to be transmitted to the terminal device, including retransmission pattern information relating to the retransmission pattern that has been decided, and retransmission processing of retransmitting the data signal including data to be transmitted to the terminal device, in accordance with the retransmission pattern that has been decided.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a retransmission pattern table.

FIG. 9A to FIG. 9D are diagrams illustrating an example of a retransmission pattern where transmission timings and frequency bands are changed to perform retransmission.

FIG. 10A to FIG. 10C are diagrams illustrating an example of a retransmission pattern where the frequency band is changed and retransmission is performed at the same transmission timing.

FIG. 11A to FIG. 11C are diagram illustrating examples of other retransmission patterns.

DESCRIPTION OF EMBODIMENTS

The present embodiment will be described below in detail with reference to the Figures. Objects and examples in the present specification are exemplary, and do not limit the scope of the present application. Particularly, the technology of the present application is applicable even if expressions in the description are different, as long as technologically equivalent, and different expressions do not limit the scope of the present application. The embodiments may be combined as appropriate within a scope where processing contents are not contradictory.

Terms and technical content described in specifications and contributions serving as standards relating to communication such as 3GPP may be applied as appropriate to terms used in the present specification and technical content described therein. An example of such a specification is 3GPP TS 38.300 V15.0.0 (December 2017).

Examples of the base station device, terminal device, wireless communication system, and wireless communication method according to the disclosure of the present application will be described below in detail, with reference to the Figures. Note that the following examples do not limit the technology of the disclosure.

First Embodiment

In a first embodiment, a base station device decides a retransmission pattern for retransmitting data to a terminal device in accordance with a communication state of wireless communication. The base station device then transmits, to a terminal device, control signals for control of allocation of wireless resources including retransmission pattern information regarding the retransmission pattern that has been decided, and data signals for data transmission including data to be transmitted to the terminal device. The base station device further retransmits data signals including data to be transmitted to the terminal device, in accordance with the retransmission pattern that has been decided.

Configuration Example of Wireless Communication System

Figure 1:
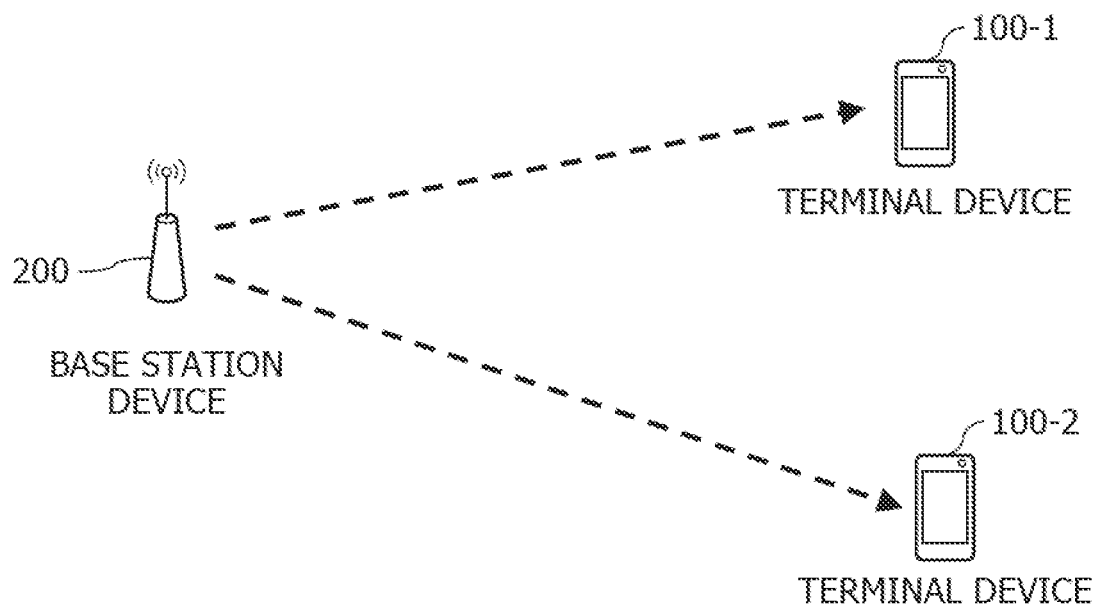
FIG. 1 is a diagram illustrating a configuration example of a wireless communication system 10.

FIG. 1 is a diagram illustrating a configuration example of a wireless communication system 10. The wireless communication system 10 includes terminal devices 100-1 and 2, and a base station device 200. The wireless communication system 10 is a wireless communication system that conforms to a communication standard such as 4G, 5G, or the like, for example.

The terminal devices 100-1 and 2 (hereinafter may be referred to as terminal device 100) are mobile communication terminals such as smartphones, tablet terminals, or the like, for example. The terminal device 100 wirelessly connects to the base station device 200 and communicates with an external network or another communication device via the base station device 200, for example. Note that the number of the terminal device 100 in the wireless communication system 10 may be three or more.

The base station device 200 wirelessly connects to the terminal device 100 and performs wireless communication with the terminal device 100. The base station device 200 also relays communication that the terminal device 100 performs with another communication device. The base station device 200 the base station device 200 is an eNodeB in a communication system conforming to LTE, or a gNodeB in the 5G communication standard, for example. Note that a plurality of base station devices 200 may be included in the wireless communication system 10.

Upon receiving data to be transmitted to the terminal device 100-1, for example, the base station device 200 allocates wireless resources to the terminal device 100-1, and transmits data to the terminal device 100-1 using the allocated wireless resources.

The base station device 200 uses signals for data transmission (data transmission signals) such as PDSCH (Physical Downlink Shared Channel) for example, to transmit downlink (from the base station device 200 to the terminal device 100) data. The base station device 200 also transmits downlink control information (DCI: Downlink Control Information) to the terminal device 100 using control signals for transmitting control information for wireless communication such as PDCCH (Physical Downlink Control Channel) for example. Downlink control information includes information relating to the frequency band and transmission timing (transmission start time, transmission time) and so forth of the PDSCH to be used, for example.

The terminal device 100 recognizes the frequency band and transmission timing of the PDSCH where the downlink data will be transmitted, by having received the above-described PDCCH, and can receive the downlink data by standing by for and receiving in this frequency band at this transmission timing.

Data is retransmitted in accordance with the situation of wireless communication, for example, in the wireless communication system 10 according to the first embodiment. The base station device 200 transmits the retransmission data information regarding the frequency band and transmission timing of retransmission data using PDCCH, of example. The terminal device 100 can receive the retransmission data by receiving the PDCCH and recognizing the transmission timing and frequency band of the retransmission data.

Configuration Example of Base Station Device

Figure 2:
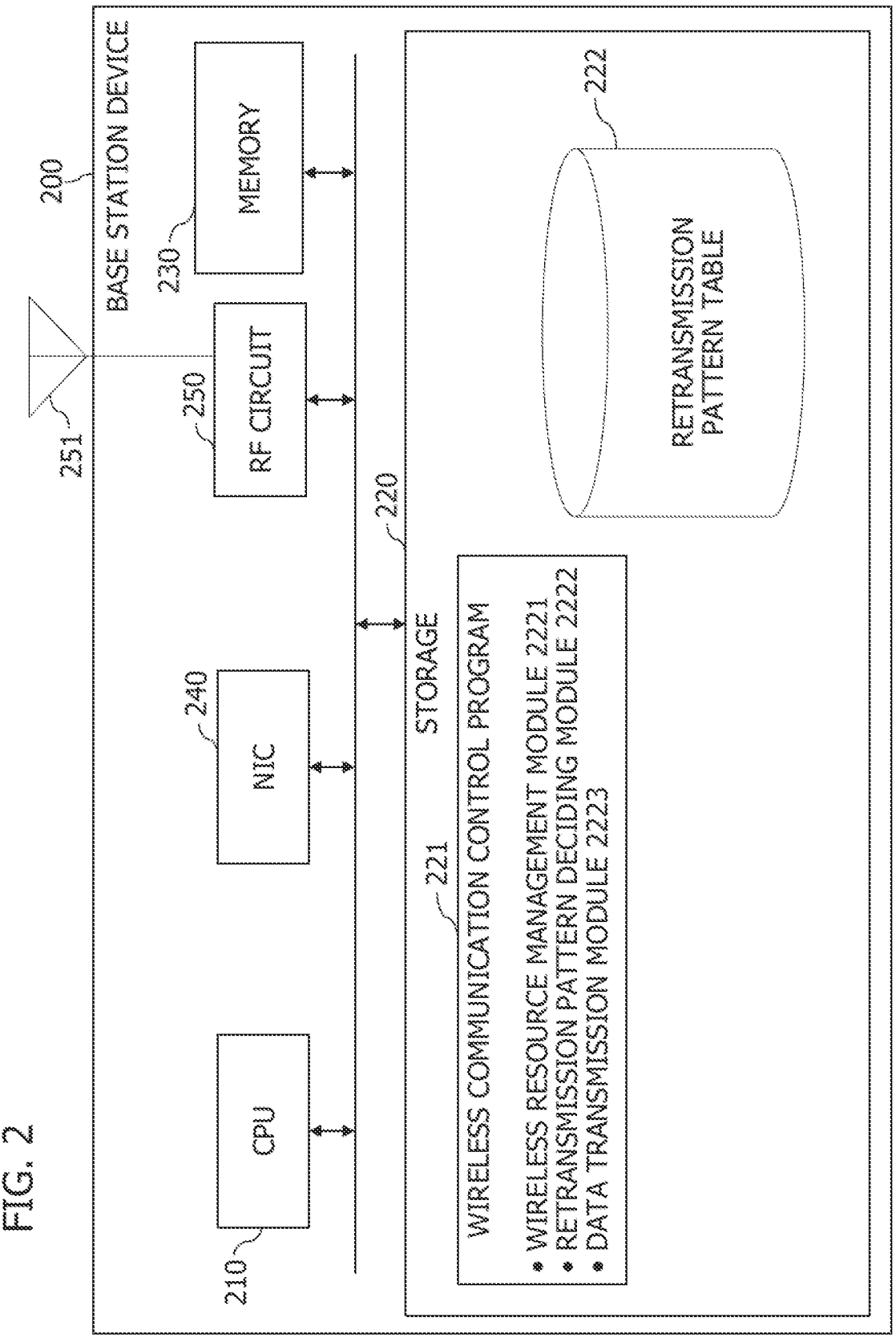
FIG. 2 is a diagram illustrating a configuration example of the base station device 200.

FIG. 2 is a diagram illustrating a configuration example of the base station device 200. The base station device 200 includes a CPU (Central Processing Unit) 210, storage 220, memory 230 such as DRAM (Dynamic Random Access Memory), an NIC (Network Interface Card) 240, and an RF (Radio Frequency) circuit 250.

The storage 220 is an auxiliary storage device such as flash memory, an HDD (Hard Disk Drive), an SSD (Solid State Drive), or the like, that stores programs and data. The storage 220 has a wireless communication control program 221 and a retransmission pattern table 222.

The retransmission pattern table 222 is a table that stores information regarding retransmission patterns, which will be described in detail later. Note that the base station device 200 may store information stored in the retransmission pattern table 222 as part of a program.

The memory 230 is a region where programs stored in the storage 220 are loaded. The memory 230 is also used as a region where programs store data.

The NIC 240 is a network interface that connects to an external network, for example. The base station device 200 relays communication of the terminal device 100 by performing transmission/reception of packets with other communication devices and external networks via the NIC 240.

The RF circuit 250 is a device that performs wireless communication (wireless connection) with the terminal device 100. The RF circuit 250 has an antenna 251 for example, and receives signals transmitted by the terminal device 100, and transmits signals to the terminal device 100.

The CPU 210 is a processor that loads programs stored in the storage 220 to the memory 230, executes the loaded programs, and realizes each processing.

The CPU 210 executes the wireless communication control program 221, thereby constructing a deciding unit (a deciding controller) and a transmission unit (a transmitter), and performing wireless communication control processing. The wireless communication control processing is processing of controlling wireless communication of the base station device 200 and the terminal device 100.

The CPU 210 also performs wireless resource management processing by executing a wireless resource management module 2221 that the wireless communication control program 221 has. The wireless resource management processing is processing of allocating wireless resources used for wireless communication to each of the plurality of terminal devices 100, and managing the allocated wireless resources.

The CPU 210 also executes a retransmission pattern deciding module 2222 that the wireless communication control program 221 has, thereby constructing a deciding unit and performing retransmission pattern deciding processing. The retransmission pattern deciding processing is processing of deciding retransmission patterns in accordance with the communication state of wireless communication, or the allocation situation of wireless resources to other terminal devices 100, for example.

The CPU 210 also executes a data transmission module 2223 that the wireless communication control program 221 has, thereby constructing a transmission unit and performing data transmission processing. The data transmission processing is processing of wirelessly transmitting data to the terminal device 100. The base station device 200 retransmits data in the data transmission processing, in accordance with the retransmission pattern decided in the retransmission pattern deciding processing.

Configuration Example of Terminal Device

Figure 3:
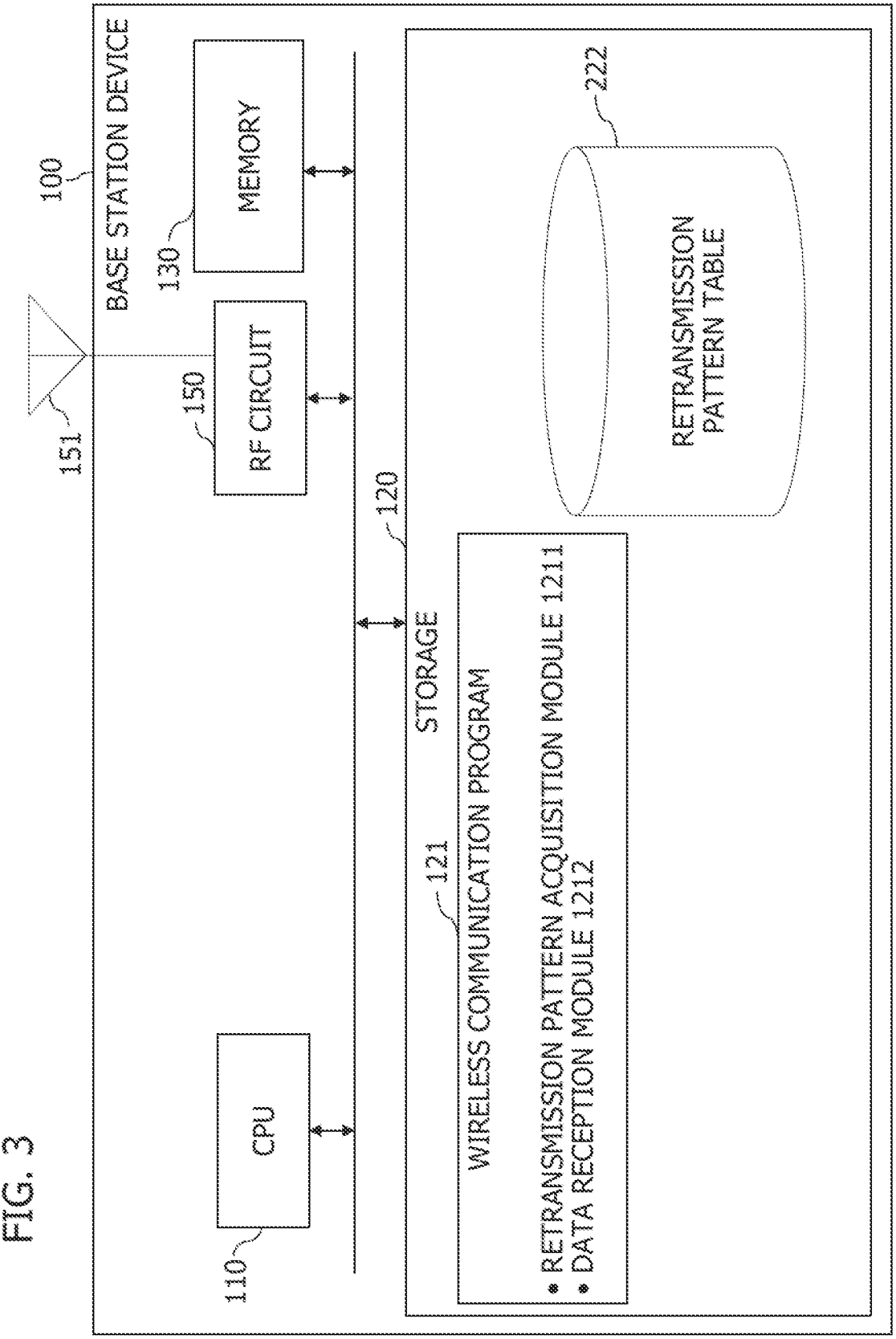
FIG. 3 is a diagram illustrating a configuration example of the terminal device 100.

FIG. 3 is a diagram illustrating a configuration example of the terminal device 100. The terminal device 100 includes a CPU 110, storage 120, memory 130 such as DRAM, and an RF circuit 150.

The storage 120 is an auxiliary storage device such as flash memory, an HDD, an SSD, or the like, that stores programs and data. The storage 120 has a wireless communication program 121 and the retransmission pattern table 222.

The memory 130 is a region where programs stored in the storage 120 are loaded. The memory 130 is also used as a region where programs store data.

The RF circuit 150 is a device that performs wireless communication with the base station device 200. The RF circuit 150 has an antenna 151 for example, and receives signals transmitted by the base station device 200, and transmits signals to the base station device 200.

The CPU 110 is a processor that loads programs stored in the storage 120 to the memory 130, executes the loaded programs, and realizes each processing.

The CPU 110 executes the wireless communication program 121, thereby constructing an acquisition unit (an acquirer) and a reception unit (a receptor), and performing wireless communication processing. The wireless communication processing is processing of wirelessly communicating with the base station device 200.

The CPU 110 also executes a retransmission pattern acquisition module 1211 that the wireless communication program 121 has, thereby constructing an acquisition unit, and performing retransmission pattern acquisition processing. The retransmission pattern acquisition processing is processing of acquiring a retransmission pattern from the base station device 200.

The CPU 110 also executes a data reception module 1212 that the wireless communication program 121 has, thereby constructing a reception unit, and performing data reception processing. The data reception processing is processing of receiving signals transmitted by the base station device 200. The terminal device 100 receives retransmitted data in the data reception processing, following a retransmission pattern acquired in the retransmission pattern acquisition processing.

Data Transmission Processing

Figure 4:
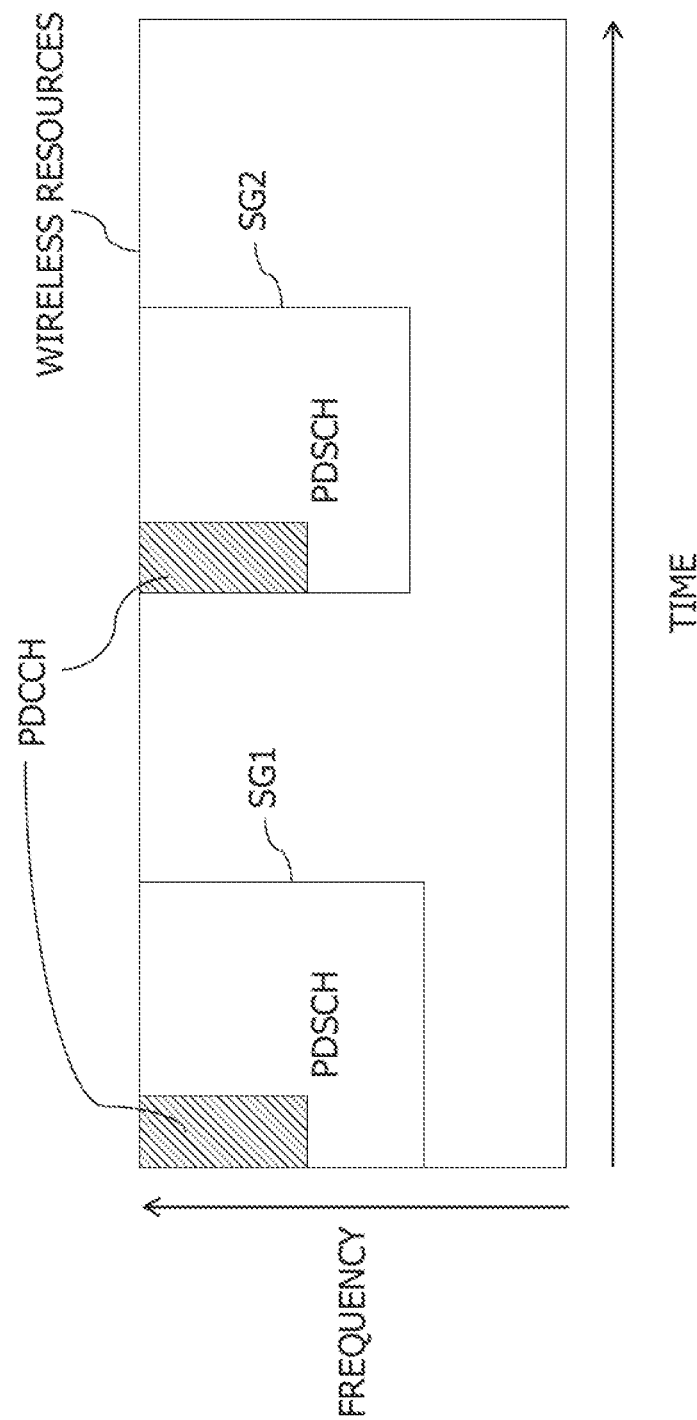
FIG. 4 is a diagram illustrating an example of data retransmission by the base station device 200 in a simple retransmission format.

FIG. 4 is a diagram illustrating an example of data retransmission by the base station device 200 in a simple retransmission format. The simple retransmission format is a format where control signals (e.g., PDCCH) are given to signals transmitting data the first time, and all signals where data is to be retransmitted, for example.

The base station device 200 has wireless resources of a predetermined frequency band and predetermined time. The base station device 200 uses part of the wireless resources for data transmission. In FIG. 4, the base station device 200 transmits signals SG1 including the PDCCH indicated by hatching and the PDSCH including the data to be transmitted, to the terminal device 100. The base station device 200 then retransmits signals SG2 that includes the same data as the signals SG1 in a case where a negative response (NACK) has been received or a positive response (ACK) has not been received in a predetermined amount of time, for example. The signals SG2 include a PDSCH including the same data as the data transmitted by signals SG1, and a PDCCH including information relating to the PDSCH to be retransmitted.

Figure 5:
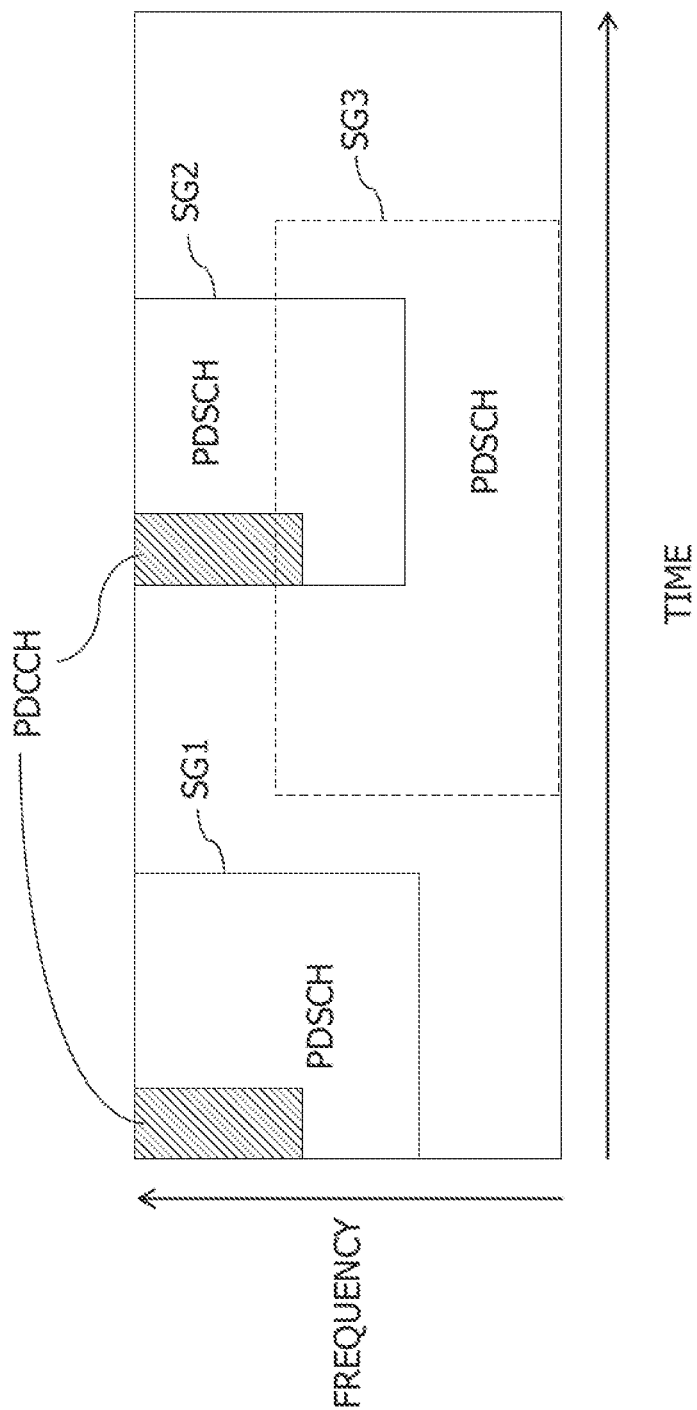
FIG. 5 is a diagram illustrating an example of data retransmission to the terminal device 100-1 in the simple retransmission format.

FIG. 5 is a diagram illustrating an example of data retransmission to the terminal device 100-1 in the simple retransmission format. The base station device 200 performs retransmission of data by the signals SG2 in the same way as in FIG. 4. However, in a case where wireless resources of signals SG3 indicated by the dotted lines in FIG. 5 have been allocated to the terminal device 100-2, wireless resources of the signals SG2 and signals SG3 partially overlap, causing interference, and the signals SG2 will not be able to be transmitted to the terminal device 100-1 without error. The base station device 200 is not able to allocate wireless resources for the signals SG2 to another terminal device 100, so that the above-described interference will not occur. Accordingly, wireless resources may not be able to be efficiently used in the simple retransmission format in some cases.

Accordingly, in the first embodiment, the base station device 200 performs data retransmission by a retransmission format where control information is not transmitted in retransmission of data (hereinafter may be referred to as new retransmission format).

Data Retransmission Processing According to New Retransmission Format

Figure 6:
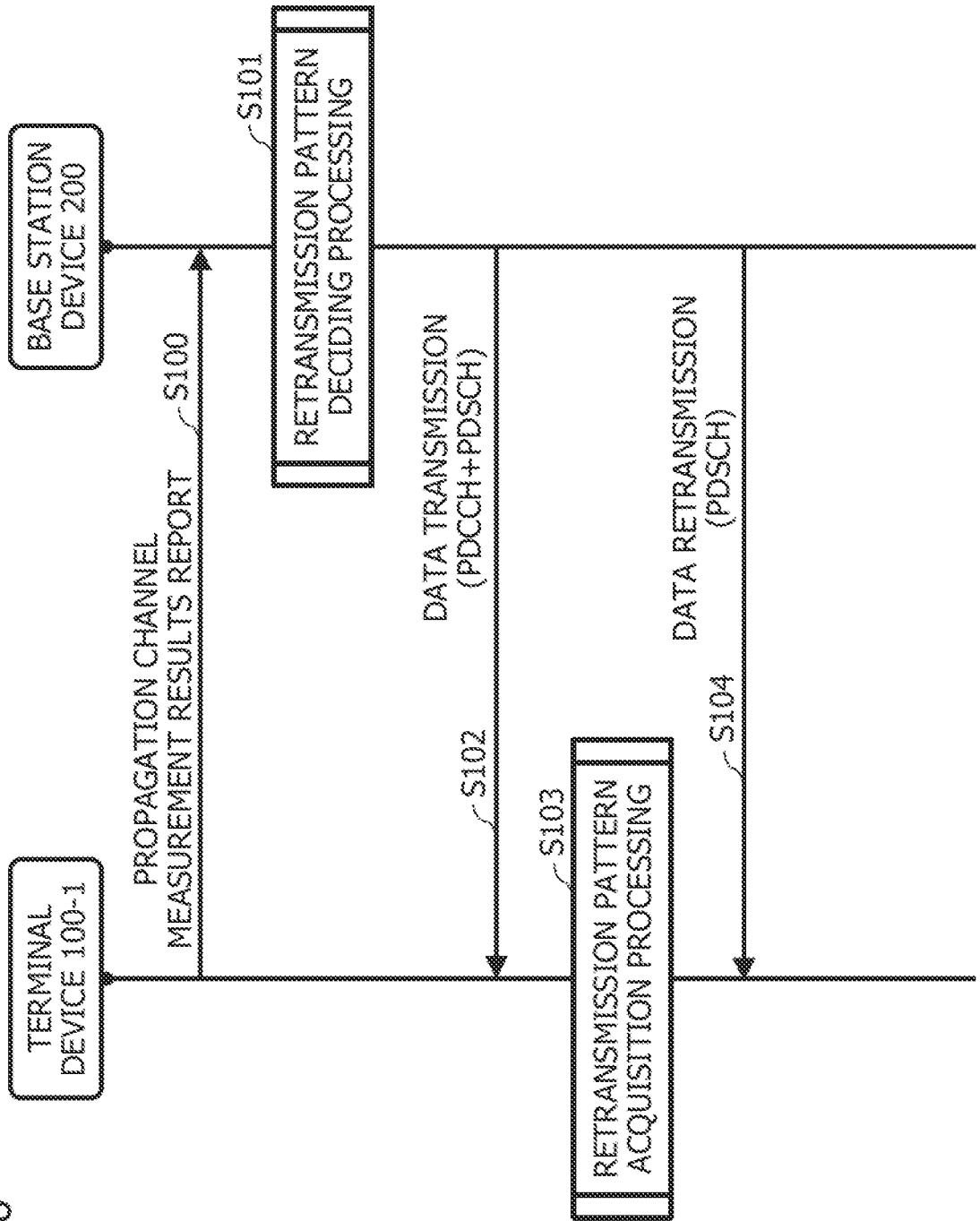
FIG. 6 is a diagram illustrating an example of a sequence in data retransmission processing according to the new retransmission format.

FIG. 6 is a diagram illustrating an example of a sequence in data retransmission processing according to the new retransmission format. The terminal device 100-1 periodically, or in response to a request from the base station device 200, for example, measures a propagation channel for wireless communication between the terminal device 100-1 and the base station device 200, and transmits a propagation channel measurement results report including the measurement results to the base station device 200 (S100).

The terminal device 100 measures reception power and interference power of signals transmitted from the base station device 200, which represents the signal strength on the propagation channel, in the measurement of the propagation channel, for example. The terminal device 100 then includes the measured reception power and interference power in the propagation channel measurement results report, which is then transmitted to the base station device 200. Note that the terminal device 100 may calculate a SINR (signal-to-interference-plus-noise ratio) from the reception power and interference power, and include the calculated SINR (interference rate) in the propagation channel measurement results report.

Upon receiving the propagation channel measurement results report, the base station device 200 performs retransmission pattern deciding processing (S101).

Figure 7:
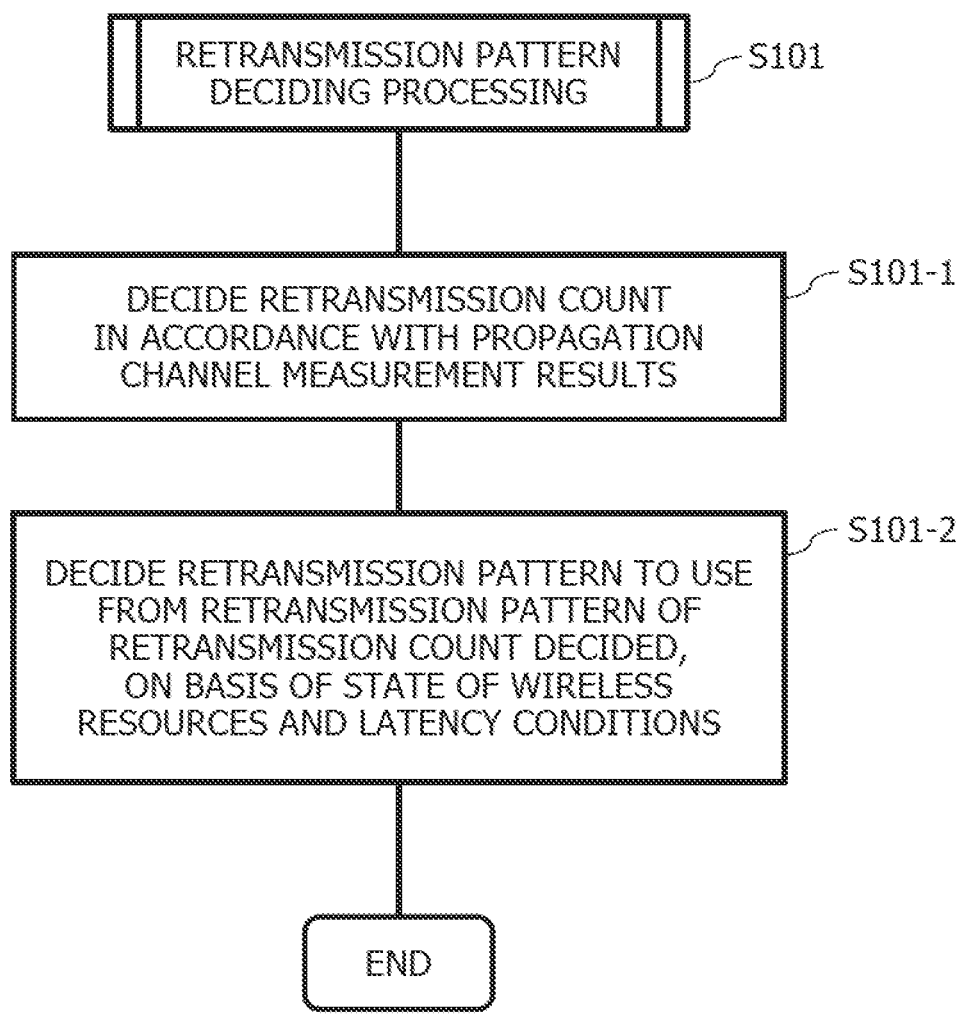
FIG. 7 is a diagram illustrating an example of a processing flowchart for the retransmission pattern deciding processing S101.

FIG. 7 is a diagram illustrating an example of a processing flowchart for the retransmission pattern deciding processing S101. The base station device 200 decides a retransmission count in accordance with the propagation channel measurement results (S101-1). The base station device 200 classifies the quality of the radio waves into five levels (level 1 is the best quality radio waves, and level 5 is the poorest quality radio waves) in accordance with the SINR value, for example. The base station device 200 then sets the retransmission count to zero times in a case of level 1 where the signal strength is the best, and thereafter the retransmission count is one in a case of level 2, the retransmission count is two in a case of level 3, the retransmission count is three in a case of level 4, and the retransmission count is four in a case of level 5, for example.

The base station device 200 decides the retransmission pattern to use from the retransmission pattern of the retransmission count that has been decided, on the basis of the state of wireless resource allocation and latency conditions in data transmission (S101-2).

FIG. 8 is a diagram illustrating an example of a retransmission pattern table. The retransmission pattern table is a table that stores information elements of "retransmission pattern No.", "retransmission count", "retransmission count (breakdown)", and "retransmission characteristics (by each retransmission count)", for example.

The "retransmission pattern No." indicates the No. of the retransmission pattern. There are ten patterns for retransmission patterns, e.g., retransmission patterns 0 through 9. Retransmission pattern 0 is a retransmission pattern where the retransmission count is zero times, and where retransmission is not performed, for example. Also for example, retransmission pattern 9 is a retransmission pattern where the retransmission count is three, and data retransmission is performed three times (four times including the first transmission).

The "retransmission count (breakdown)" is information regarding the frequency band and time (transmission timing) for signals to retransmit data. "Same time, different frequency" indicates the retransmission count for retransmission at the same transmission timing and at a different frequency band from the signals transmitted the first time. "Different time, same frequency" indicates the retransmission count for retransmission at a different transmission timing and at the same frequency band as the signals transmitted the first time. "Different time, different frequency" indicates the retransmission count for retransmission at a different transmission timing and a different frequency band from the signals transmitted the first time.

The "retransmission characteristics (by each transmission count)" is information indicating the characteristics of signals to retransmit data by each retransmission count. The "retransmission characteristics (by each transmission count)" indicates, for example, difference in frequency band and transmission timing as to the signals the first time. The "retransmission characteristics (by each transmission count)" also indicates, for example, dividing into two signals where the frequency band is not consecutive.

FIG. 9A to FIG. 9D are diagrams illustrating an example of a retransmission pattern where transmission timings and frequency bands are changed to perform retransmission. Hereinafter, retransmission of the N'th (where N is an integer) time will be expressed as N+1'th time of transmission. For example, transmission of a total of three times is performed in a retransmission pattern where retransmission is performed two times.

FIG. 9A is a diagram illustrating an example of retransmission pattern 0. The base station device 200 does not perform retransmission in retransmission pattern 0, and performs the first transmission by signals SG01.

FIG. 9B is a diagram illustrating an example of retransmission pattern 1. The base station device 200 performs the first transmission by signals SG11 in retransmission pattern 1. The signals SG11 include a PDCCH including information relating to the retransmission pattern. Note that a PDCCH including information relating to the retransmission pattern (e.g., retransmission pattern No.) in the signals transmitted the first time is transmitted, in the other retransmission patterns as well. The base station device 200 includes retransmission data in signals SG12 temporally consecutive from the signals SG11 and using a frequency band that is lower than the frequency band of signals SG11 by FB, and performs data transmission of the second time.

FIG. 9C is a diagram illustrating an example of retransmission pattern 3. The base station device 200 performs the first transmission by signals SG31 in retransmission pattern 3. The base station device 200 includes retransmission data in signals SG32 temporally consecutive from the signals SG31 and using a frequency band that is lower than the frequency band of signals S31 by FB, and performs data transmission of the second time. The base station device 200 further includes retransmission data in signals SG33 temporally consecutive from the signals SG32 and using a frequency band that is lower than the frequency band of signals SG32 by FB, and performs data transmission of the third time.

FIG. 9D is a diagram illustrating an example of retransmission pattern 5. The base station device 200 performs the first transmission by signals SG51 in retransmission pattern 5. The base station device 200 includes retransmission data in signals SG52 temporally consecutive from the signals SG51 and using a frequency band that is lower than the frequency band of signals SG51 by FB, and performs data transmission of the second time. The base station device 200 further includes retransmission data in signals SG53 temporally consecutive from the signals SG52 and using a frequency band that is lower than the frequency band of signals SG52 by FB, and performs data transmission of the third time. The base station device 200 moreover includes retransmission data in signals SG54 temporally consecutive from the signals SG53 and using a frequency band that is lower than the frequency band of signals SG53 by FB, and performs data transmission of the fourth time. Note however, that in a case where the frequency band of the signals SG54 exceeds to lower limit of allocable wireless resources as illustrated in FIG. 9D, a frequency band for the portion exceeding the lower limit is allocated from the uppermost frequency band of allocable wireless resources, thereby dividing into two frequency bands and transmitting, for example.

FIG. 10A to FIG. 10C are diagrams illustrating an example of a retransmission pattern where the frequency band is changed and retransmission is performed at the same transmission timing. FIG. 10A is a diagram illustrating an example of retransmission pattern 2. The base station device 200 performs the first transmission by signals SG21 in retransmission pattern 2. The base station device 200 includes retransmission data in signals SG22 using a frequency band that is lower than the frequency band of signals SG21 by FA at the same transmission timing as signals SG21, and performs data transmission of the second time.

FIG. 10B is a diagram illustrating an example of retransmission pattern 7. The base station device 200 performs the first transmission by signals SG71 in retransmission pattern 7. The base station device 200 also includes retransmission data in signals SG72 using a frequency band that is lower than the frequency band of signals SG71 by FA at the same transmission timing as signals SG71, and performs data transmission of the second time. The base station device 200 further includes retransmission data in signals SG73 temporally consecutive from the signals SG71 and using the same frequency band as signals SG71, and performs data transmission of the third time. The base station device 200 further includes retransmission data in signals SG74 temporally consecutive from the signals SG72 and using the same frequency band as signals SG72, and performs data transmission of the fourth time.

FIG. 10C is a diagram illustrating an example of retransmission pattern 8. The base station device 200 performs the first transmission by signals SG81 in retransmission pattern 8. The base station device 200 also includes retransmission data in signals SG82 using a frequency band that is lower than the frequency band of signals SG81 by FA at the same transmission timing as signals SG81, and performs data transmission of the second time. The base station device 200 further includes retransmission data in signals SG83 at a first time period after the signals SG81 and using the same frequency band as signals SG81, and performs data transmission of the third time. The base station device 200 further includes retransmission data in signals SG84 at a first time period after the signals SG82 and using the same frequency band as signals SG82, and performs data transmission of the fourth time. The first time period is a time period of transmitting PDSCH once, or a time period of one slot.

FIG. 11A to FIG. 11C are diagram illustrating examples of other retransmission patterns. FIG. 11A is a diagram illustrating an example of retransmission pattern 4. The base station device 200 performs the first transmission by signals SG41 in retransmission pattern 4. The base station device 200 includes retransmission data in signals SG42 using a frequency band that is lower than the frequency band of signals SG41 by FA at the same transmission timing as signals SG41, and performs data transmission of the second time. The base station device 200 further includes retransmission data in signals SG43 temporally consecutive from the signals SG41 and using a frequency band that is lower than the frequency band of signals SG41 by FB, and performs data transmission of the third time.

FIG. 11B is a diagram illustrating an example of retransmission pattern 6. Retransmission pattern 6 is a retransmission pattern where the transmission time (time of starting transmission) of the third time in retransmission pattern 5 is not temporally consecutive from the transmission of the second time, and transmission is performed after a first time period. The base station device 200 performs the first transmission by signals SG61 in retransmission pattern 6. The base station device 200 includes retransmission data in signals SG62 temporally consecutive from the signals SG61 and using a frequency band that is lower than the frequency band of signals SG61 by FB, and performs data transmission of the second time. The base station device 200 further includes retransmission data in signals SG63 at the first time period after the signals SG62 and using a frequency band that is lower than the frequency band of signals SG62 by FB, and performs data transmission of the third time. The base station device 200 moreover includes retransmission data in signals SG64 temporally consecutive from the signals SG63 and using a frequency band that is lower than the frequency band of signals SG63 by FB, and performs data transmission of the fourth time. In a case where the frequency band of the signals SG64 exceeds to lower limit of allocable wireless resources, a frequency band for the portion exceeding the lower limit is allocated from the uppermost frequency band of allocable wireless resources, thereby dividing into two frequency bands and transmitting.

FIG. 11C is a diagram illustrating an example of retransmission pattern 9. Retransmission pattern 9 is a retransmission pattern where the third transmission in retransmission pattern 8 is divided into two signals of different frequencies that are temporally consecutive, and transmitting. The base station device 200 performs the first transmission by signals SG91 in retransmission pattern 9. The base station device 200 also includes retransmission data in signals SG92 using a frequency band that is lower than the frequency band of signals SG91 by FA at the same transmission timing as signals SG91, and performs data transmission of the second time. The base station device 200 further uses signals SG93-1 temporally consecutive from the signals SG91 and using part of the same frequency band as signals SG91 (the upper half in FIG. 11A to FIG. 11C) and signals S93-2 temporally following the signals S93-1 and using part of the same frequency band as signals S91 not used by the signals S93-1, and performs transmission of the third time. The base station device 200 further includes retransmission data in signals SG94 at a first time period after the signals SG92 and using the same frequency band as signals SG92, and performs data transmission of the fourth time.

Note that in retransmission patterns 1, 3, 5, and 6, for example, consecutive frequency bands are used for transmission of the first transmission and retransmission, but transmission may be performed using a plurality of non-continuous frequency bands. The frequency band for retransmission may be a frequency band that is higher than the frequency band in the first transmission.

Returning to FIG. 7, an example of a method for deciding the retransmission pattern at the base station device 200 will be described, with reference to the retransmission patterns in FIG. 8 through FIG. 11C.

In processing S101-1, the base station device 200 decides the retransmission count to be one time, for example. The base station device 200 decides retransmission pattern 1 where the retransmission count is one time, and retransmission pattern 2, to be candidates for the retransmission pattern to be used.

In processing S101-2, the base station device 200 confirms the state of wireless resources. The state of wireless resources indicates wireless resources used by another terminal device 100-2, for example. The base station device 200 excludes retransmission patterns where part or all overlap between the wireless resources of signals to be retransmitted and wireless resources that have been decided to be used by, or may possibly be used by another terminal device 100-2. In a case where there is one retransmission pattern remaining without being excluded, the base station device 200 decides the remaining retransmission pattern to be the retransmission pattern to be used.

The base station device 200 may also decide the retransmission pattern where retransmission ends the earliest to be the retransmission pattern to be used. Retransmission that ends the earliest indicates that latency of data transmission is a short time in a case of the terminal device 100 acquiring data by retransmitted data. The base station device 200 compares retransmission pattern 1 and retransmission pattern 2 for example, and decides retransmission pattern 2 where retransmission ends earlier to be the retransmission pattern to be used.

Further, the base station device 200 may decide the retransmission pattern to be used on the basis of latency conditions of data to be transmitted. Latency conditions are delay time permissible from the first data transmission till the terminal device 100 correctly receives this data, for example. Latency conditions are also is time permissible from data reaching the base station device 200 till the terminal device 100 correctly receives this data, for example.

Latency conditions are defined as, for example, urgency of data to be transmitted, and requisite conditions of the wireless communication system 10. When assuming that the terminal device 100 will receive the last-retransmitted data, the base station device 200 determines whether or not latency conditions are satisfied. The base station device 200 then decides a retransmission pattern that satisfies the latency conditions as the retransmission pattern to be used.

The base station device 200 may combine two or all selections of the above-described selection by state of wireless resources, selection by time to retransmission ending, and selection by latency conditions. The base station device 200 may also decide a retransmission pattern by assigning an order of priority to each of these three selections.

Returning to the sequence in FIG. 6, the base station device 200 performs data transmission the first time, once an opportunity to transmit data to the terminal device 100-1 occurs (S102). The base station device transmits control signals (e.g., PDCCH) in the data transmission the first time. The PDCCH includes retransmission pattern information including the retransmission pattern No., for example. The retransmission pattern information may also include, for example, values of FA and FB used in the retransmission patterns, and predetermined time (time interval in a case where retransmission is not temporally consecutive). The base station device 200 includes data to be transmitted to the terminal device 100-1 in data signals (e.g., PDSCH) and transmits the data.

The terminal device 100 that has received the PDCCH performs retransmission pattern acquisition processing (S103). The retransmission pattern acquisition processing is processing where the retransmission pattern information is extracted from the PDCCH, and retransmission data is received in accordance with the retransmission pattern that the base station device 200 has decided. Note that in a case of having received data without error, the terminal device 100 may transmit an ACK to the base station device 200 and not receive subsequent retransmission data.

The base station device 200 retransmits data by the retransmission pattern that has been decided (S104). The base station device 200 transmits data being retransmitted by PDSCH, and does not transmit a PDCCH. Note that in a case of having received an ACK before retransmitting data, the base station device 200 does not have to perform retransmission of data.

In the first embodiment, the base station device 200 retransmits data to the terminal device 100 even without having received a NACK. Accordingly, the base station device 200 performs retransmission without awaiting reception of a NACK, and thus can retransmit data at an early time, whereby delay of data transmission can be suppressed.

Also, a PDCCH including a retransmission pattern is transmitted at the time of data transmission the first time, and no PDCCH is transmitted at the time of transmitting retransmission data, thereby enabling overhead of the terminal device 100 receiving a PDCCH in each retransmission to be reduced.

Further, the base station device 200 decides retransmission patterns on the basis of measurement results of the propagation channel between itself and the terminal device 100, and wireless resources allocated to other terminal devices 100. Accordingly, a retransmission pattern with a higher probability of the retransmission data reaching the terminal device without error can be decided.

Second Embodiment

The retransmission pattern information included in a PDCCH is preferably as small in volume as possible, in a case where the capacity of information transmittable by PDCCH is small or the information to be transmitted by PDCCH is predetermined and the capacity of other information that can be included is small, for example. Accordingly, in a second embodiment, the base station device 200 includes part or all of retransmission pattern information in an RRC (Radio Resource Control) message that controls the wireless network, and transmits to the terminal device 100.

Data Retransmission Processing According to New Retransmission Format

Figure 12:
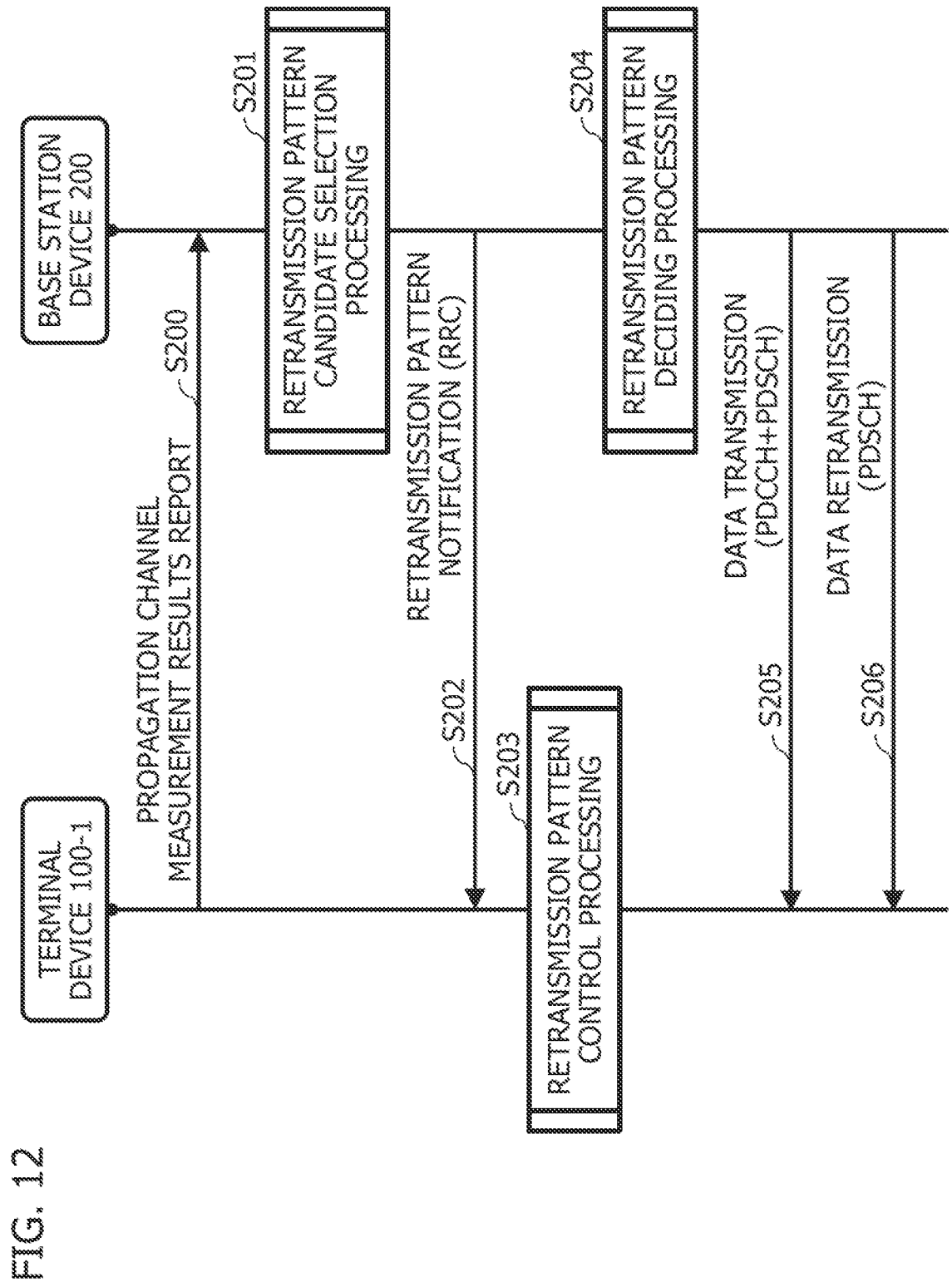
FIG. 12 is a diagram illustrating an example of a sequence in data retransmission processing according to the new retransmission format.

FIG. 12 is a diagram illustrating an example of a sequence in data retransmission processing according to the new retransmission format. The terminal device 100-1 transmits a propagation channel measurement results report including measurement results to the base station device 200 (S200).

Upon receiving the propagation channel measurement results, the base station device 200 performs retransmission pattern candidate selection processing (S201). The retransmission pattern candidate selection processing S201 is processing of selecting one or a plurality of candidates for retransmission patterns to use with the terminal device 100-1. For example, the retransmission count is decided in the same way as in the processing 101-1 in FIG. 7, and a retransmission pattern for the decided retransmission count is selected as a candidate for the retransmission pattern to be used.

The base station device 200 transmits a retransmission pattern notification including the selected retransmission pattern to the terminal device 100-1 by RRC message (S202).

The terminal device 100-1 receives the retransmission pattern notification, and thereupon performs retransmission pattern control processing (S203).

Figure 13:
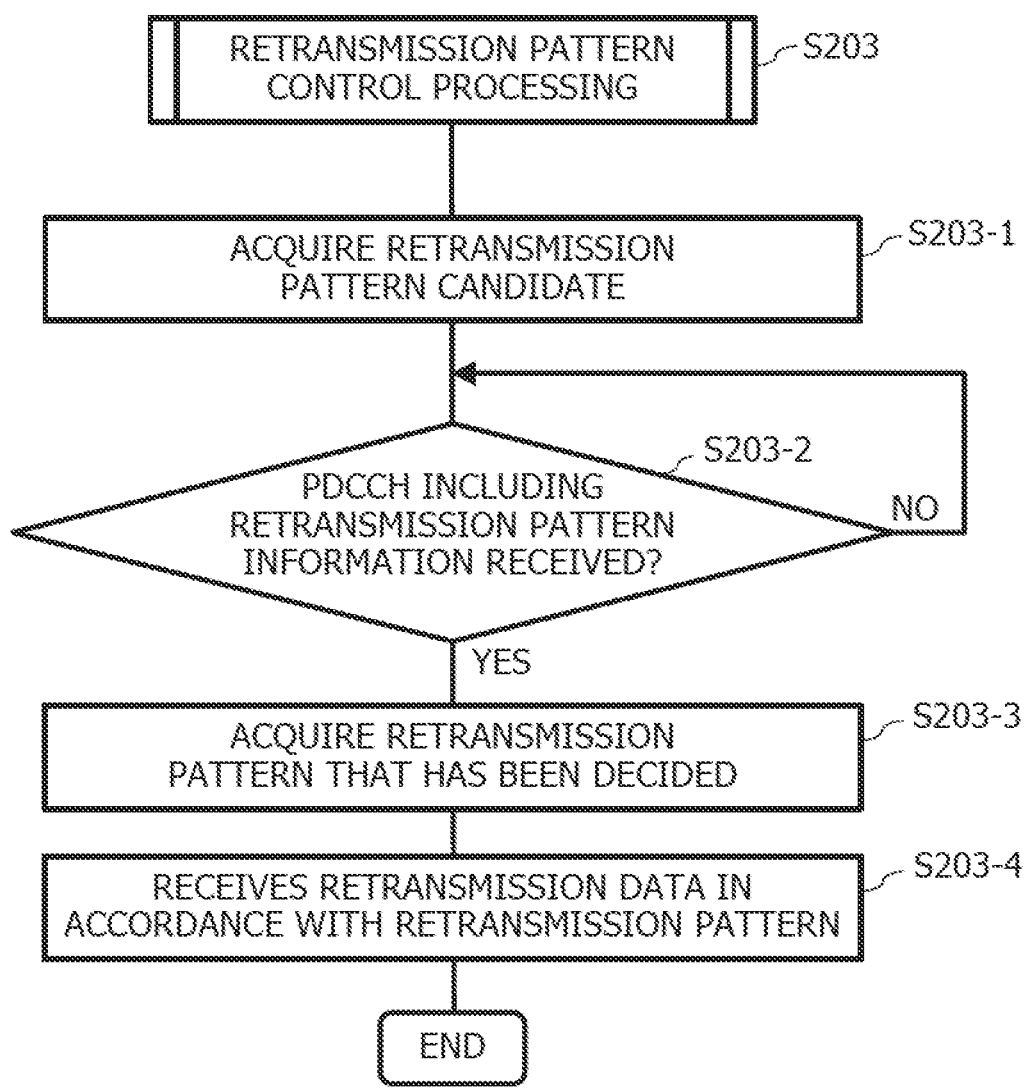
FIG. 13 is a diagram illustrating an example of a processing flowchart of the retransmission pattern control processing S203.

FIG. 13 is a diagram illustrating an example of a processing flowchart of the retransmission pattern control processing S203. The terminal device 100 acquires a retransmission pattern candidate from the retransmission pattern notification (S203-1). The terminal device 100 then stands by to receive a PDCCH including the retransmission pattern (No in S203-2).

Upon having received the PDCCH (Yes in S203-2), the terminal device 100 acquires the retransmission pattern to be used (S203-3). The terminal device 100 then receives the retransmission data in accordance with the retransmission pattern to be used (S203-4).

Returning to the sequence in FIG. 12, the base station device 200 performs retransmission pattern deciding processing, once an opportunity to transmit data to the terminal device 100-1 occurs (S204). The retransmission pattern deciding processing S204 is processing of deciding a retransmission pattern to use from retransmission pattern candidates, and is the same processing as the processing 101-2 in FIG. 7, for example.

The base station device 200 includes the retransmission pattern that has been decided in a PDCCH and transmits the data to the terminal device 100-1 (S205). The base station device 200 includes data to be transmitted to the terminal device 100-1 in data signals (e.g., PDCCH) and transmits the data.

The terminal device 100-1 receives the PDCCH in the retransmission pattern control processing S203, and thereupon acquires the retransmission pattern that has been decided (S203-2 in FIG. 13). The terminal device 100-1 thereafter receives the retransmission data in accordance with the retransmission pattern that has been decided (S203-3 in FIG. 13).

The base station device 200 then retransmits the data by the retransmission pattern that has been decided (S206). The base station device 200 does not transmit a PDCCH during retransmission.

Note that in a case of the base station device 200 notifying the terminal device 100-1 of the retransmission pattern using one bit of the PDCCH, for example, the processing is as follows.

The base station device 200 performs notification that retransmission pattern candidates are, for example, retransmission patterns 1 and 2, in the retransmission pattern notification. The terminal device 100-1 recognizes that the retransmission pattern candidates are retransmission patterns 1 and 2.

In a case of having decided to use retransmission pattern 1 in the retransmission pattern deciding processing S204, the base station device 200 sets the bit in the PDCCH indicating the retransmission pattern that has been decided to "0", and in a case of having decided to use retransmission pattern 2, sets this bit to "1".

The terminal device 100-1 determines that, in a case where the bit is 0 for example, the retransmission pattern to be used is the retransmission pattern 1, which is the candidate retransmission pattern with the smaller retransmission pattern No., and in a case where the bit is 1, determines that the retransmission pattern to be used is the retransmission pattern 2, which is the candidate retransmission pattern with the larger retransmission pattern No. Accordingly, the terminal device 100-1 can acquire the retransmission pattern that has been decided even if the number of bits used in the PDCCH is one bit. Note that the base station device 200 may decide the number of candidate retransmission patterns in accordance with the number of bits usable in the PDCCH, such as the number of candidate retransmission patterns being four in a case where the number of bits that can be used in the PDCCH is two bits, and so forth.

The number of bits indicating information regarding retransmission patterns in a PDCCH can be reduced in the second embodiment, by transmitting candidate retransmission patterns by RRC message.

Further, the retransmission pattern table may be, for example, an MCS (Modulation and Coding Scheme), or a table where allocation contents of wireless resources used for each transmission are combined. Using a lower MCS in a case where the retransmission count is great is assumed in combinations of retransmission patterns and MCS, and accordingly the base station device 200 may reduce control signals by eliminating, or not storing in memory, combinations of retransmission patterns with great retransmission counts and a higher MCS, for example.

Third Embodiment

The base station device 200 may instruct the terminal device 100 to perform retransmission in uplink (from the terminal device 100 to the base station device 200) communication as well, for example.

Figure 14:
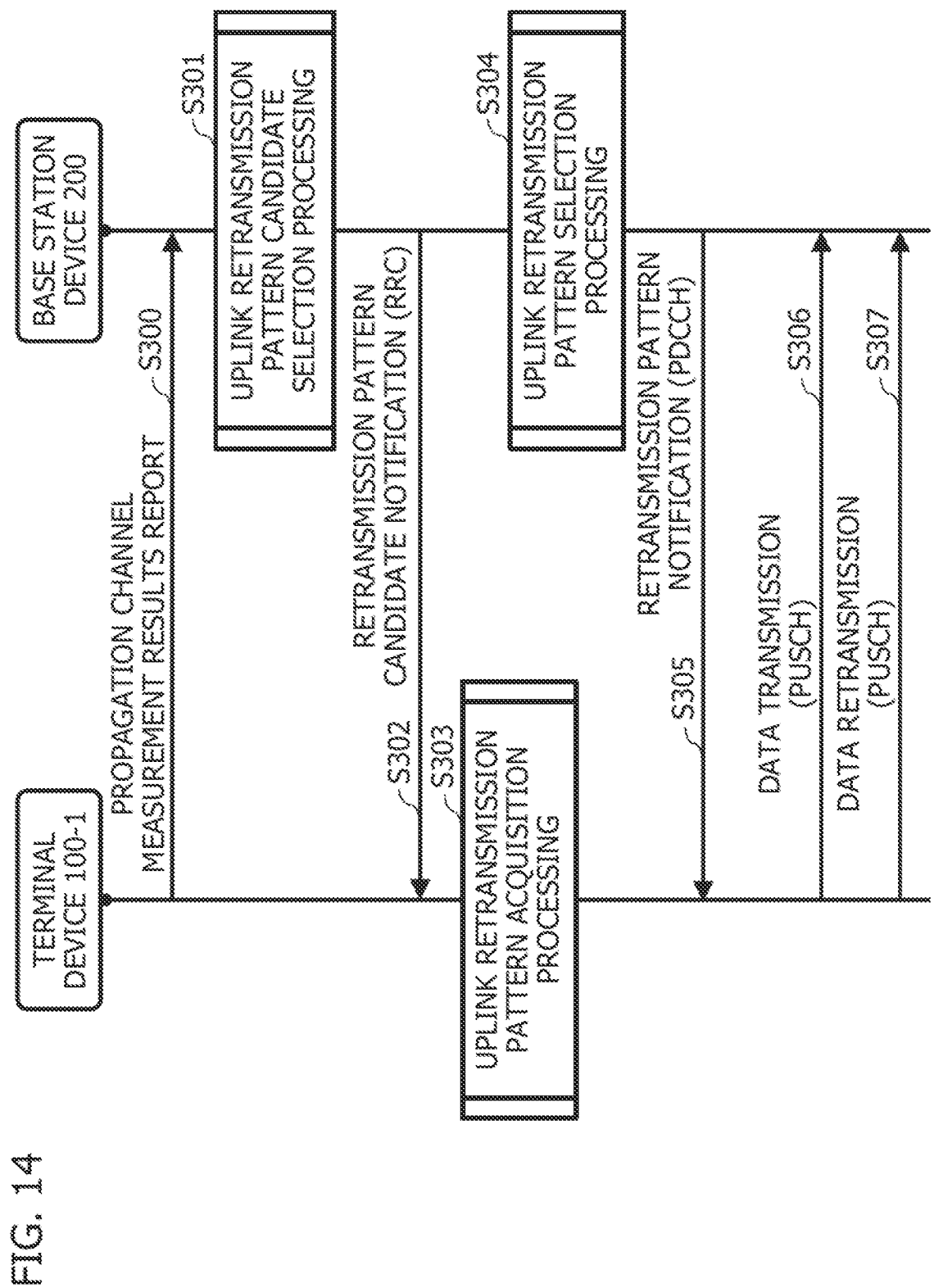
FIG. 14 is a diagram illustrating an example of a sequence of uplink data retransmission processing according to the new retransmission format.

FIG. 14 is a diagram illustrating an example of a sequence of uplink data retransmission processing according to the new retransmission format. The terminal device 100-1 transmits a propagation channel measurement results report including measurement results to the base station device 200 (S300).

Upon receiving the propagation channel measurement results, the base station device 200 performs uplink retransmission pattern candidate selection processing (S301). The uplink retransmission pattern candidate selection processing S301 is processing of selecting one or a plurality of candidates for retransmission patterns to use with the terminal device 100-1. For example, the retransmission count is decided in the same way as in the processing 101-1 in FIG. 7, and a retransmission pattern for the decided retransmission count is selected as a candidate for the retransmission pattern to be used.

The base station device 200 receives propagation channel measurement results from the terminal device 100-1 in FIG. 14. The terminal device 100-1 measures signal strength of downlink signals, and accordingly the base station device 200 selects candidates for uplink retransmission patterns assuming that downlink and uplink radio wave properties (e.g., degree of interference and so forth) are equivalent, for example. Note that the base station device 200 may measure uplink signal strength.

The base station device 200 transmits a candidate retransmission pattern notification including the selected retransmission pattern to the terminal device 100-1 by RRC message (S302).

The terminal device 100-1 receives the retransmission pattern notification, and thereupon performs uplink retransmission pattern acquisition processing (S303). The terminal device 100-1 acquires the uplink retransmission pattern candidate in the uplink retransmission pattern control processing S303.

The base station device 200 performs uplink retransmission pattern selection processing, once an opportunity to transmit data to the terminal device 100-1 occurs (S304). The uplink retransmission pattern selection processing S304 is processing of deciding a retransmission pattern to use from retransmission pattern candidates, and is the same processing as the processing 101-2 in FIG. 7, for example.

The base station device 200 transmits the PDCCH including the uplink retransmission pattern that has been decided to the terminal device 100-1 (S305). The terminal device 100-1 receives the PDCCH in the uplink retransmission pattern acquisition processing S303, and thereupon acquires the retransmission pattern that has been decided. The terminal device 100-1 thereafter performs data transmission (S306) and data retransmission (S307) using a PUSCH (Physical Uplink Shared Channel) in accordance with the retransmission pattern that has been decided.

The base station device 200 can also control uplink data retransmission in the third embodiment.

Other Embodiments

The base station device 200 may change an RV (Redundancy Version) defined in HARQ (Hybrid-ARQ (Automatic repeat request)) each data transmission, for example. Combining different RVs of the same transport block at the receiving side enables greater gain to be obtained, and error rate can be reduced.

According to an aspect, delay in data transmission can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: Wireless communication system
100 Terminal device
110 CPU
120 Storage
121 Wireless communication program
130 Memory
150 RF circuit 151 Antenna
200 Base station device
210 CPU
220 Storage
221 Wireless communication control program
222 Retransmission pattern table
230 Memory
250 RF circuit
251 Antenna
1211 Retransmission pattern acquisition module
1212 Data reception module
2221 Wireless resource management module
2222 Retransmission pattern deciding module
2223 Data transmission module

What is claimed is:

1. A base station device performing wireless communication with a terminal device, the base station device comprising:
    processor circuitry configured to determine, out of a plurality of resource patterns including a first resource pattern including a plurality of resources that are consecutive in a time domain and a second resource pattern including a plurality of resources that are non-consecutive in the time domain, a resource pattern;
    a transmitter configured to transmit, to the terminal device, a control signal for wireless resource allocation control including resource pattern information relating to the resource pattern; and
    a receiver configured to receive initial-time transmission data and retransmission data, the initial-time transmission data and the retransmission data being transmitted from the terminal device in accordance with the resource pattern information,
    wherein the transmitter is further configured to transmit a RRC (Radio Resource Control) message including configuration information relating at least part of the plurality of resource patterns, wherein the RRC message is different from the control signal.

2. The base station device according to claim 1, wherein the receiver is further configured to receive the initial-time transmission data in a first time resource, and the retransmission data in a second time resource different from the first time resource.

3. The base station device according to claim 1, wherein the receiver is further configured to receive the initial-time transmission data in a first frequency resource, and the retransmission data in a second frequency resource different from the first frequency resource.

4. The base station device according to claim 1, wherein the processor circuitry is further configured to determine the resource pattern in accordance with a wireless communication state;
    the wireless communication state includes an interference rate indicating a degree of interference occurring in a signal, other than the control signal, that the terminal device receives from the base station device.

5. The base station device according to claim 1, wherein the control signal is transmitted by @ PDCCH (Physical Downlink Control Channel); and
    the initial-time transmission data and the retransmission data are transmitted by PDSCH (Physical Downlink Shared Channel).

6. The base station device according to claim 1, wherein the control signal includes information relating the first time resource.

7. The base station device according to claim 1, wherein the resource pattern information is one bit information.

8. The base station device according to claim 1, wherein the plurality of resources of the first resource pattern are used by the initial-time transmission data and the retransmission data when the first resource pattern is determined as the resource pattern, and
    the plurality of resources of the second resource pattern are used by the initial-time transmission data and the retransmission data when the second resource pattern is determined as the resource pattern.

9. A terminal device performing wireless communication with a network device, the terminal device comprising:
    a receiver configured to receive, from the network device, a control signal for wireless resource allocation control including resource pattern information relating to a resource pattern, the resource pattern being determined out of a plurality of resource patterns including a first resource pattern including a plurality of resources that are consecutive in a time domain and a second resource pattern including a plurality of resources that are non-consecutive in the time domain; and
    a transmitter configured to transmit initial-time transmission data and retransmission data in accordance with the resource pattern information,
    wherein the receiver is further configured to receive a RRC (Radio Resource Control) message including configuration information relating at least part of the plurality of resource patterns, wherein the RRC message is different from the control signal.

10. The terminal device according to claim 9, wherein the transmitter is further configured to transmit the initial-time transmission data in a first time resource, and the retransmission data in a second time resource different from the first time resource.

11. The terminal device according to claim 9, wherein the transmitter is further configured to transmit the initial-time transmission data in a first frequency resource, and the retransmission data in a second frequency resource different from the first frequency resource.

12. The terminal device according to claim 9, wherein the control signal is transmitted by a PDCCH (Physical Downlink Control Channel); and
    the initial-time transmission data and the retransmission data are transmitted by a PDSCH (Physical Downlink Shared Channel).

13. The terminal device according to claim 9, wherein the plurality of resources of the first resource pattern are used by the initial-time transmission data and the retransmission data when the first resource pattern is determined as the resource pattern, and
    the plurality of resources of the second resource pattern are used by the initial-time transmission data and the retransmission data when the second resource pattern is determined as the resource pattern.

14. A wireless communication system comprising:
    a base station; and
    a terminal configured to communicate with the base station, wherein
    the base station is further configured to:
        transmit a RRC (Radio Resource Control) message including configuration information relating at least part of a plurality of resource patterns, a plurality of resource patterns including a first resource pattern including a plurality of resources that are consecutive in a time domain and a second resource pattern including a plurality of resources that are non-consecutive in the time domain, determine, out of the plurality of resource patterns, a resource pattern, transmit, to the terminal device, a control signal for wireless resource allocation control including resource pattern information relating to the resource pattern, and receive initial-time transmission data and retransmission data, the initial-time transmission data and the retransmission data being transmitted from the terminal device in accordance with the resource pattern information, wherein the RRC message is different from the control signal.

* * * * *